US012292075B2

(12) United States Patent
Stephan et al.

(10) Patent No.: US 12,292,075 B2
(45) Date of Patent: May 6, 2025

(54) TWIST-LOCK SOLAR MODULE CLAMP

(71) Applicant: PEGASUS SOLAR INC, Richmond, CA (US)

(72) Inventors: Erich Kai Stephan, Richmond, CA (US); Glenn Harris, Richmond, CA (US); Peter Wilke, Richmond, CA (US); Nicholas Wenzel, Richmond, CA (US); James Hsieh, Richmond, CA (US)

(73) Assignee: PEGASUS SOLAR INC, Richmond, CA (US)

( * ) Notice: Subject to any disclaimer, the term of this patent is extended or adjusted under 35 U.S.C. 154(b) by 625 days.

(21) Appl. No.: 17/102,749

(22) Filed: Nov. 24, 2020

(65) Prior Publication Data

US 2021/0156413 A1    May 27, 2021

Related U.S. Application Data

(60) Provisional application No. 62/940,119, filed on Nov. 25, 2019.

(51) Int. Cl.
| | | |
|---|---|---|
| *F16B 37/04* | (2006.01) | |
| *F16B 5/00* | (2006.01) | |
| *H01R 4/44* | (2006.01) | |
| *H02S 30/00* | (2014.01) | |
| *F24S 25/60* | (2018.01) | |

(52) U.S. Cl.
CPC .......... *F16B 37/045* (2013.01); *F16B 5/0068* (2013.01); *H01R 4/44* (2013.01); *H02S 30/00* (2013.01); *F24S 25/60* (2018.05); *F24S 2025/6006* (2018.05)

(58) Field of Classification Search
CPC .. F16B 2200/93; F16B 37/046; F16B 37/045; F16B 5/0068
See application file for complete search history.

(56) References Cited

U.S. PATENT DOCUMENTS

| | | |
|---|---|---|
| 2,394,729 A | 8/1944 | Tinnerman |
| 2,712,917 A | 3/1951 | Flora et al. |
| 3,066,900 A | 12/1962 | Holton |

(Continued)

FOREIGN PATENT DOCUMENTS

| | | |
|---|---|---|
| AU | 2020287090 | 12/2021 |
| AU | 2020336321 | 2/2022 |

(Continued)

OTHER PUBLICATIONS

PCT Application No. PCT/US2020/035874, International Preliminary Report on Patentability dated Dec. 7, 2021.

(Continued)

*Primary Examiner* — Gary W Estremsky
(74) *Attorney, Agent, or Firm* — Polsinelli LLP

(57) ABSTRACT

A twist-lock clamp to attach a solar module to a rail system includes a spring between a top clamp and a t-nut, with features on the spring and top clamp to restrict rotation relative to each other. The t-nut includes features allowing rotation of about 90 degrees when the t-nut is inserted in a rail, but restrict rotation beyond about 90 degrees. The spring serves to hold the top clamp and t-nut apart while allowing the twist-lock clamp to resist sliding in the rail during installation.

18 Claims, 28 Drawing Sheets

(56) References Cited

U.S. PATENT DOCUMENTS

| | | | |
|---|---|---|---|
| 3,122,604 A | 2/1964 | Cook et al. | |
| 3,145,753 A | 8/1964 | Kreider | |
| 3,966,342 A | 6/1976 | Moriya | |
| 4,159,758 A | 7/1979 | Courson | |
| 4,269,043 A | 5/1981 | Kizu et al. | |
| 4,285,379 A * | 8/1981 | Kowalski | F16B 37/046 |
| | | | 411/85 |
| 4,570,408 A | 2/1986 | Frascaroli et al. | |
| 4,729,706 A | 3/1988 | Peterson et al. | |
| 4,897,005 A | 1/1990 | Peterson et al. | |
| 4,907,388 A | 3/1990 | Siahatgar | |
| 4,950,841 A | 8/1990 | Walker et al. | |
| 5,144,780 A | 9/1992 | Gieling et al. | |
| 5,203,135 A | 4/1993 | Bastian | |
| D353,209 S | 12/1994 | Dallaire et al. | |
| 5,423,646 A | 6/1995 | Gagnon | |
| 5,489,173 A * | 2/1996 | Hofle | F16B 37/046 |
| | | | 411/85 |
| 5,596,237 A | 1/1997 | Daniels | |
| 5,657,604 A | 8/1997 | Malott | |
| 5,713,707 A | 2/1998 | Gagnon | |
| 6,032,939 A | 3/2000 | Chen | |
| 6,086,300 A | 7/2000 | Frohlich | |
| 6,205,719 B1 | 3/2001 | Bruce | |
| 6,568,873 B1 | 5/2003 | Peterson | |
| 6,874,971 B2 | 4/2005 | Albaugh | |
| 7,077,855 B2 | 7/2006 | Curtis | |
| 7,434,362 B2 | 10/2008 | Liebendorfer | |
| 7,568,855 B2 | 8/2009 | Fitzler et al. | |
| 7,832,180 B2 | 11/2010 | Dolby | |
| 7,866,098 B2 | 1/2011 | Cinnamon | |
| 7,878,745 B2 | 2/2011 | Allen et al. | |
| 8,070,119 B2 | 12/2011 | Taylor | |
| 8,181,926 B2 * | 5/2012 | Magno, Jr. | F24S 25/636 |
| | | | 248/220.21 |
| 8,375,661 B1 | 2/2013 | diGirolamo et al. | |
| 8,387,319 B1 | 3/2013 | Gilles-Gagnon et al. | |
| 8,567,030 B2 | 10/2013 | Koch et al. | |
| 8,656,658 B2 | 2/2014 | Shufflebotham | |
| 8,695,290 B1 | 4/2014 | Kim et al. | |
| 8,893,445 B2 | 11/2014 | Yen | |
| 8,919,075 B2 | 12/2014 | Erickson | |
| 8,935,893 B2 | 1/2015 | Liu et al. | |
| 8,938,932 B1 | 1/2015 | Wentworth et al. | |
| D732,698 S | 6/2015 | Meng | |
| 9,121,433 B1 | 9/2015 | Bacon | |
| 9,181,705 B2 | 11/2015 | Lanza | |
| 9,249,813 B2 | 2/2016 | Kalman | |
| 9,267,529 B2 | 2/2016 | Tejero Salinero | |
| 9,350,288 B2 | 5/2016 | Hardikar | |
| 9,447,988 B2 | 9/2016 | Stearns et al. | |
| 9,473,066 B2 | 10/2016 | Stephan et al. | |
| 9,531,319 B2 * | 12/2016 | Braunstein | F24S 25/00 |
| 9,590,405 B1 | 3/2017 | Maurer | |
| 9,590,406 B1 | 3/2017 | Maurer | |
| 9,705,299 B1 | 3/2017 | Maurer et al. | |
| 9,660,570 B2 | 5/2017 | Stephan | |
| 9,689,411 B2 | 6/2017 | Meine et al. | |
| 9,819,303 B2 | 11/2017 | Ash | |
| 9,837,954 B2 | 12/2017 | Ash | |
| 9,893,677 B1 | 2/2018 | Liu | |
| 10,097,133 B2 | 10/2018 | Aliabadi et al. | |
| 10,205,418 B2 | 2/2019 | Nayar | |
| 10,211,775 B1 | 2/2019 | Wentworth et al. | |
| 10,218,305 B1 | 2/2019 | Schrock | |
| 10,270,383 B2 | 4/2019 | Wildes et al. | |
| 10,288,319 B2 | 5/2019 | Li et al. | |
| 10,305,415 B2 | 5/2019 | McPheeters et al. | |
| 10,340,838 B2 | 7/2019 | Schuit et al. | |
| 10,472,828 B2 | 11/2019 | Stearns et al. | |
| 10,749,459 B1 * | 8/2020 | Liu | F16B 5/0685 |
| 10,847,960 B1 | 11/2020 | Naugler et al. | |
| 10,914,513 B1 * | 2/2021 | Dhage | F25D 25/02 |
| 11,143,436 B1 | 10/2021 | Stephan et al. | |
| 11,258,397 B2 * | 2/2022 | Von Deylen | H02S 30/00 |
| 11,296,648 B1 | 4/2022 | Jasmin et al. | |
| 11,313,591 B1 * | 4/2022 | Atia | F24S 25/636 |
| 11,336,222 B1 | 5/2022 | Garza et al. | |
| 11,377,840 B2 | 7/2022 | Stephan et al. | |
| 11,463,040 B2 | 10/2022 | Affentranger, Jr. | |
| 11,486,434 B2 | 11/2022 | Kovacs et al. | |
| 11,608,627 B2 | 3/2023 | Stephan et al. | |
| 11,611,310 B2 | 3/2023 | Stephan et al. | |
| 11,757,400 B1 | 9/2023 | Jasmin et al. | |
| D1,004,141 S | 11/2023 | Stephan et al. | |
| 11,811,358 B2 | 11/2023 | Von Deylen | |
| 11,848,636 B2 | 12/2023 | Stephan et al. | |
| 11,990,862 B2 | 5/2024 | Stephan et al. | |
| 12,139,905 B2 | 11/2024 | Stephan et al. | |
| 2003/0177706 A1 | 9/2003 | Ullman | |
| 2007/0248434 A1 | 10/2007 | Wiley et al. | |
| 2008/0310913 A1 | 12/2008 | Urban et al. | |
| 2009/0003961 A1 | 1/2009 | Padfield et al. | |
| 2009/0114269 A1 | 5/2009 | Fletcher et al. | |
| 2010/0202853 A1 * | 8/2010 | Merhar | F16B 37/046 |
| | | | 411/344 |
| 2010/0281793 A1 | 11/2010 | McPheeters et al. | |
| 2011/0001030 A1 | 1/2011 | Hochreiter et al. | |
| 2011/0194886 A1 | 8/2011 | Wu et al. | |
| 2011/0240101 A1 | 10/2011 | Sagayama et al. | |
| 2011/0253859 A1 | 10/2011 | Ostermeier et al. | |
| 2012/0097207 A1 | 4/2012 | Shufflebotham et al. | |
| 2012/0325761 A1 | 12/2012 | Kübsch et al. | |
| 2013/0008490 A1 | 1/2013 | Rego et al. | |
| 2013/0121760 A1 | 5/2013 | Chen et al. | |
| 2013/0200234 A1 | 8/2013 | Zhao et al. | |
| 2013/0247485 A1 | 9/2013 | Zimmerman et al. | |
| 2013/0291479 A1 | 11/2013 | Schaefer et al. | |
| 2013/0299656 A1 | 11/2013 | Kemmer et al. | |
| 2014/0000681 A1 | 1/2014 | Zhao et al. | |
| 2014/0010616 A1 | 1/2014 | Meine et al. | |
| 2014/0014163 A1 | 1/2014 | McCarthy et al. | |
| 2014/0026946 A1 | 1/2014 | West et al. | |
| 2014/0042286 A1 | 2/2014 | Jaffari | |
| 2014/0079510 A1 * | 3/2014 | Suzuki | F16B 33/02 |
| | | | 411/411 |
| 2014/0102517 A1 | 4/2014 | Meine et al. | |
| 2014/0154908 A1 | 6/2014 | Magno et al. | |
| 2014/0165499 A1 | 6/2014 | Vanker et al. | |
| 2014/0220834 A1 | 8/2014 | Rizzo | |
| 2014/0353435 A1 | 12/2014 | Liu et al. | |
| 2015/0101997 A1 | 4/2015 | Liu et al. | |
| 2015/0102194 A1 | 4/2015 | Liu | |
| 2015/0180404 A1 | 6/2015 | Braunstein et al. | |
| 2015/0226246 A1 | 8/2015 | Kirchner | |
| 2015/0311606 A1 | 10/2015 | Meine et al. | |
| 2015/0316086 A1 | 11/2015 | Urban et al. | |
| 2015/0357773 A1 | 12/2015 | Schirmeier | |
| 2015/0381106 A1 | 12/2015 | Fujikawa et al. | |
| 2016/0006390 A1 | 1/2016 | Cinnamon et al. | |
| 2016/0043687 A1 | 2/2016 | McPheeters et al. | |
| 2016/0069592 A1 | 3/2016 | Giraudo et al. | |
| 2016/0087576 A1 | 3/2016 | Johansen et al. | |
| 2016/0111996 A1 | 4/2016 | Stephan et al. | |
| 2016/0156169 A1 | 6/2016 | Jaena et al. | |
| 2016/0282018 A1 | 6/2016 | Ash et al. | |
| 2016/0233820 A1 | 8/2016 | Redel | |
| 2016/0248367 A1 | 8/2016 | Almy et al. | |
| 2016/0268958 A1 | 9/2016 | Wildes et al. | |
| 2016/0285408 A1 | 9/2016 | Ash et al. | |
| 2016/0329671 A1 | 11/2016 | Kokenda et al. | |
| 2017/0033730 A1 * | 2/2017 | Almy | H02S 20/30 |
| 2017/0063301 A1 | 3/2017 | Ash | |
| 2017/0093327 A1 | 3/2017 | Stephan et al. | |
| 2017/0133977 A1 | 5/2017 | Tripp et al. | |
| 2017/0146041 A1 | 5/2017 | Schaefer et al. | |
| 2017/0170579 A1 * | 6/2017 | Martin | F24S 25/636 |
| 2017/0201080 A1 | 7/2017 | Maurer et al. | |
| 2017/0233996 A1 | 8/2017 | Abernathy et al. | |
| 2017/0237386 A1 * | 8/2017 | Stephan | F16B 2/065 |
| | | | 248/316.6 |
| 2017/0366131 A1 | 12/2017 | Stearns et al. | |
| 2018/0062561 A1 | 3/2018 | Kapla et al. | |
| 2018/0076605 A1 * | 3/2018 | Garcia | H02G 3/0608 |

(56) References Cited

U.S. PATENT DOCUMENTS

| | | | |
|---|---|---|---|
| 2018/0091091 A1 | 3/2018 | Rossi | |
| 2018/0094418 A1 | 4/2018 | Winter | |
| 2018/0245331 A1 | 8/2018 | Tang et al. | |
| 2018/0316307 A1 | 11/2018 | Martin | |
| 2018/0342974 A1* | 11/2018 | Jasmin | F24S 25/636 |
| 2018/0367093 A1 | 12/2018 | Ayers et al. | |
| 2019/0013772 A1 | 1/2019 | Bamat et al. | |
| 2019/0049151 A1 | 2/2019 | Harris et al. | |
| 2019/0154306 A1 | 5/2019 | Rothschild | |
| 2019/0178274 A1 | 6/2019 | Katz | |
| 2019/0211543 A1 | 7/2019 | Abernathy et al. | |
| 2019/0264452 A1 | 8/2019 | Cangelosi | |
| 2019/0326847 A1* | 10/2019 | Zuritis | F16B 5/0685 |
| 2020/0056370 A1 | 2/2020 | Hebiishi et al. | |
| 2020/0313604 A1 | 10/2020 | Harris et al. | |
| 2020/0389122 A1 | 12/2020 | Stephan | |
| 2020/0403559 A1 | 12/2020 | Kresse et al. | |
| 2021/0058023 A1 | 2/2021 | Bamat et al. | |
| 2021/0067083 A1 | 3/2021 | Stephan | |
| 2021/0156135 A1 | 5/2021 | Stephan et al. | |
| 2021/0194158 A1 | 6/2021 | Ash et al. | |
| 2021/0222421 A1 | 7/2021 | Meine | |
| 2021/0242821 A1 | 8/2021 | MacDonald et al. | |
| 2021/0285689 A1 | 9/2021 | Affentranger, Jr. | |
| 2021/0310513 A1 | 10/2021 | Feldmann et al. | |
| 2022/0077815 A1 | 3/2022 | Wentworth et al. | |
| 2022/0173692 A1 | 6/2022 | Schuit et al. | |
| 2022/0190781 A1 | 6/2022 | Stephan | |
| 2022/0216821 A1 | 7/2022 | Harris et al. | |
| 2022/0239247 A1 | 7/2022 | Stephan | |
| 2022/0263458 A1 | 8/2022 | Stephan | |
| 2022/0298776 A1 | 9/2022 | Stephan | |
| 2022/0345074 A1 | 10/2022 | Neal et al. | |
| 2022/0407449 A1 | 12/2022 | Lepley et al. | |
| 2023/0178904 A1 | 6/2023 | Stephan et al. | |
| 2023/0204972 A1 | 6/2023 | Wu et al. | |
| 2023/0228372 A1 | 7/2023 | Stephan | |
| 2023/0287674 A1 | 9/2023 | Stephan et al. | |
| 2024/0060598 A1 | 2/2024 | Wogan et al. | |
| 2024/0154570 A1 | 5/2024 | Stephan et al. | |
| 2024/0171116 A1 | 5/2024 | Stephan et al. | |
| 2024/0263842 A1 | 8/2024 | Stephan | |
| 2025/0003208 A1 | 1/2025 | Stephan et al. | |
| 2025/0055408 A1 | 2/2025 | Stephan | |

FOREIGN PATENT DOCUMENTS

| | | |
|---|---|---|
| AU | 2022405369 | 5/2024 |
| CA | 3239051 | 6/2023 |
| CN | 110454997 | 11/2019 |
| DE | 202012012830 | 1/2014 |
| EM | 008534556-0001 | 10/2021 |
| EP | 2239783 | 10/2010 |
| EP | 3981029 | 4/2022 |
| EP | 4013970 | 6/2022 |
| EP | 4022765 | 7/2022 |
| EP | 4066283 | 10/2022 |
| EP | 4214832 | 7/2023 |
| EP | 4237637 | 9/2023 |
| EP | 4419758 | 8/2024 |
| HK | 40074229 | 12/2022 |
| HK | 40080613 | 5/2023 |
| JP | 2011117168 | 6/2011 |
| JP | 2011127330 | 6/2011 |
| JP | 2013177778 | 9/2013 |
| JP | 5520544 | 6/2014 |
| JP | 2015059366 | 3/2015 |
| MX | 2022/001475 A | 3/2022 |
| MX | 2022004556 A | 5/2022 |
| MX | 64445 | 6/2022 |
| MX | 2024006899 | 6/2024 |
| WO | WO 2020/247463 | 12/2020 |
| WO | WO 2021/041408 | 3/2021 |
| WO | WO 2021/108492 | 6/2021 |
| WO | WO 2021/108696 | 6/2021 |
| WO | WO 2021/119458 | 6/2021 |
| WO | WO 2022/132135 | 6/2022 |
| WO | WO 2022/159122 | 7/2022 |
| WO | WO 2023/107563 | 6/2023 |
| WO | WO 2023/107569 | 6/2023 |
| WO | WO 2024/039912 | 2/2024 |
| WO | WO 2024/097416 | 5/2024 |
| WO | WO 2024/168100 | 8/2024 |
| WO | WO 2025/034927 | 2/2025 |

OTHER PUBLICATIONS

PCT Application No. PCT/US2020/035874, International Search Report and Written Opinion dated Aug. 18, 2020.
PCT Application No. PCT/US2020/047792, International Preliminary Report on Patentability dated Mar. 1, 2022.
PCT Application No. PCT/US2020/047792, International Search Report and Written Opinion dated Nov. 9, 2020.
PCT Application No. PCT/US2020/065160, International Search Report and Written Opinion dated Apr. 20, 2021.
PCT Application No. PCT/US2020/062151, International Preliminary Report on Patentability dated May 17, 2022.
PCT Application No. PCT/US2020/062406, International Preliminary Report on Patentability dated May 17, 2022.
PCT Application No. PCT/US2020/062406, International Search Report and Written Opinion dated Mar. 30, 2021.
PCT Application No. PCT/US2021/020708, International Search Report and Written Opinion dated Jul. 21, 2021.
U.S. Appl. No. 16/889,635, Final Office Action mailed Nov. 4, 2022.
U.S. Appl. No. 16/889,635, Office Action mailed Sep. 28, 2022.
U.S. Appl. No. 17/001,357, Office Action mailed Jun. 3, 2022.
U.S. Appl. No. 17/120,534, Office Action mailed May 26, 2021.
U.S. Appl. No. 17/118,771, Final Office Action mailed Nov. 7, 2022.
U.S. Appl. No. 17/118,771, Office Action mailed Aug. 11, 2022.
U.S. Appl. No. 17/155,624 Office Action mailed May 26, 2022.
U.S. Appl. No. 17/834,7744 Office Action mailed Nov. 10, 2022.
European Patent Office, Application No. 20893136.0, European Search Report dated Aug. 2, 2023, 5 pages.
PCT Application No. PCT/US2022/052152, International Search Report and Written Opinion dated Mar. 28, 2023.
European Patent Office, Application No. 20819161.9, European Search Report dated Apr. 20, 2023, 4 pages.
U.S. Appl. No. 16/889,635, Office Action mailed Mar. 17, 2023.
U.S. Appl. No. 17/672,567 Office Action mailed Jun. 30, 2023.
U.S. Appl. No. 18/109,814 Office Action mailed Sep. 14, 2023.
PCT/US2020/065160, Erich Kai Stephan, Hidden End Clamp, Dec. 15, 2020.
AU 2020336321, Erich Kai Stephan, Kit of Cross-Compatible Parts for Multiple Solar Installation Methods, Jan. 7, 2022.
EP 20857031.7, Erich Kai Stephan, Kit of Cross-Compatible Parts for Multiple Solar Installation Methods, Jan. 25, 2022.
MX/a/2022/001475, Erich Kai Stephan, Kit of Cross-Compatible Parts for Multiple Solar Installation Methods, Feb. 2, 2022.
HK62022063342.9, Erich Kai Stepan, Kit of Cross-Compatible Parts for Multiple Solar Installation Methods, Nov. 3, 2022.
PCT/US2021/020708, Erich Kai Stephan, Hinged Solar Mount, Mar. 3, 2021.
EP21921576.1, Erich Kai Stephan, Hinged Solar Mount, May 31, 2023.
PCT/US2020/062406, Erich Kai Stephan, One-Piece Bonding Splice for Rails, Nov. 25, 2020.
EP 20891880.5, Erich Kai Stephan, One-Piece Bonding Splice for Rails, May 6, 2022.
HK62023069412.2, Erich Kai Stephan, One-Piece Bonding Splice for Rails, Mar. 2, 2023.
EP 8534556, Erich Kai Stephan, Rail, May 10, 2021.
MX/f/2021/001551, Erich Kai Stephan, Rail, May 27, 2021.
PCT/US2020/035874, Erich Kai Stephan, Skip Rail System, Jun. 3, 2020.
AU 2020287090, Erich Kai Stephan, Skip Rail System, Nov. 10, 2021.
EP 20819161.9, Erich Kai Stephan, Skip Rail System, Nov. 25, 2021.

(56) References Cited

OTHER PUBLICATIONS

PCT/US2020/062151, Erich Kai Stephan, Twist-Lock Solar Module Clamp, Nov. 25, 2020.
EP 20893136.0, Erich Kai Stephan, Twist-Lock Solar Module Clamp, Mar. 17, 2022.
MX/a/2022/004556, Erich Kai Stephan, Twist-Lock Solar Module Clamp, Apr. 13, 2022.
PCT/US2022/052152, Erich Kai Stephan, Rail Splice With Interference Features, Dec. 7, 2022.
U.S. Appl. No. 18/435,927, Erich Kai Stephan, Tilt Leg System for Solar Panel Arrays, filed Feb. 7, 2024.
PCT/US2024/014904, Erick Kai Stephan, Tilt Leg System for Solar Panel Arrays, Feb. 7, 2024.
U.S. Appl. No. 18/386,912, Erich Kai Stephan, Module Coupling Clamp, filed Nov. 3, 2023.
PCT/US2023/036805, Erich Kai Stephan, Module Coupling Clamp, Nov. 3, 2023.
PCT/US2023/030741, Ian Wogan, Roof Attachment With Integrated Sealant, Aug. 21, 2023.
PCT Application No. PCT/US2023/030741, International Search Report and Written Opinion dated Jan. 17, 2024.
U.S. Appl. No. 17/118,771, Office Action mailed Feb. 12, 2024.
U.S. Appl. No. 17/118,771, Final Office Action mailed Oct. 10, 2023.
U.S. Appl. No. 17/118,771, Office Action mailed Apr. 6, 2023.
International Search Report and Written Opinion issued by the International Searching Authority on Feb. 17, 2021, 10 pages, for corresponding International Patent Application No. PCT/US2020/062151.
PCT Application No. PCT/US2020/065160, International Preliminary Report on Patentability dated Jun. 29, 2023.
European Patent Office, Application No. 20966131.3, Partial Supplementary European Search Report dated Sep. 24, 2024.
European Patent Office, Application No. 21921576.1, Partial Supplementary European Search Report dated Sep. 4, 2024.
European Patent Office, Application No. 20857031.7, Extended European Search Report dated Aug. 23, 2023.
U.S. Appl. No. 17/103,682, Final Office Action dated Nov. 12, 2021.
U.S. Appl. No. 17/103,682, Office Action dated Jun. 9, 2021.
U.S. Appl. No. 18/886,818, US, Erich Kai Stephan, One-Piece Bonding Splice for Rails, filed Sep. 16, 2024.
U.S. Appl. No. 90/019,642, US, Erich Kai Stephan, Skip Rail Syste, filed Aug. 30, 2024.
EP 23855544.5, EP, Ian Wogan, Roof Attachment With Integrated Sealant, Dec. 2, 2024.
Definition of "Splice", Cambridge English Dictionary, https://dictionary.cambridge.org/us/dictionary/english/splice downloaded Jul. 22, 2024.
PCT Application No. PCT/US2021/020708, International Preliminary Report on Patentability dated Aug. 3, 2023.
PCT Application No. PCT/US2022/052152, International Preliminary Report on Patentability and dated Jun. 20, 2024.
U.S. Appl. No. 90/019,642, Request for Ex Parte Rcexamination of U.S. Pat. No. 11,848,636 filed Aug. 30, 2024.
PCT Application No. PCT/US2024/014904, International Search Report and Written Opinion dated May 20, 2024.
PCT Application No. PCT/US2023/036805, International Search Report and Written Opinion dated Apr. 2, 2024.
European Patent Office, Application No. 20891880.5, European Search Report dated Mar. 14, 2024.
U.S. Appl. No. 18/098,012, Office Action dated Jun. 20, 2024.
U.S. Appl. No. 18/109,814, Office Action mailed Mar. 15, 2024.
Australian Application No. 2020287090, Examination Report No. 1 dated Feb. 7, 2025.
European Patent Office, Application No. 20966131.3, Extended European Search Report dated Dec. 17, 2024.
European Patent Office, Application No. 21921576.1, Extended European Search Report dated Dec. 16, 2024.

* cited by examiner

111

111

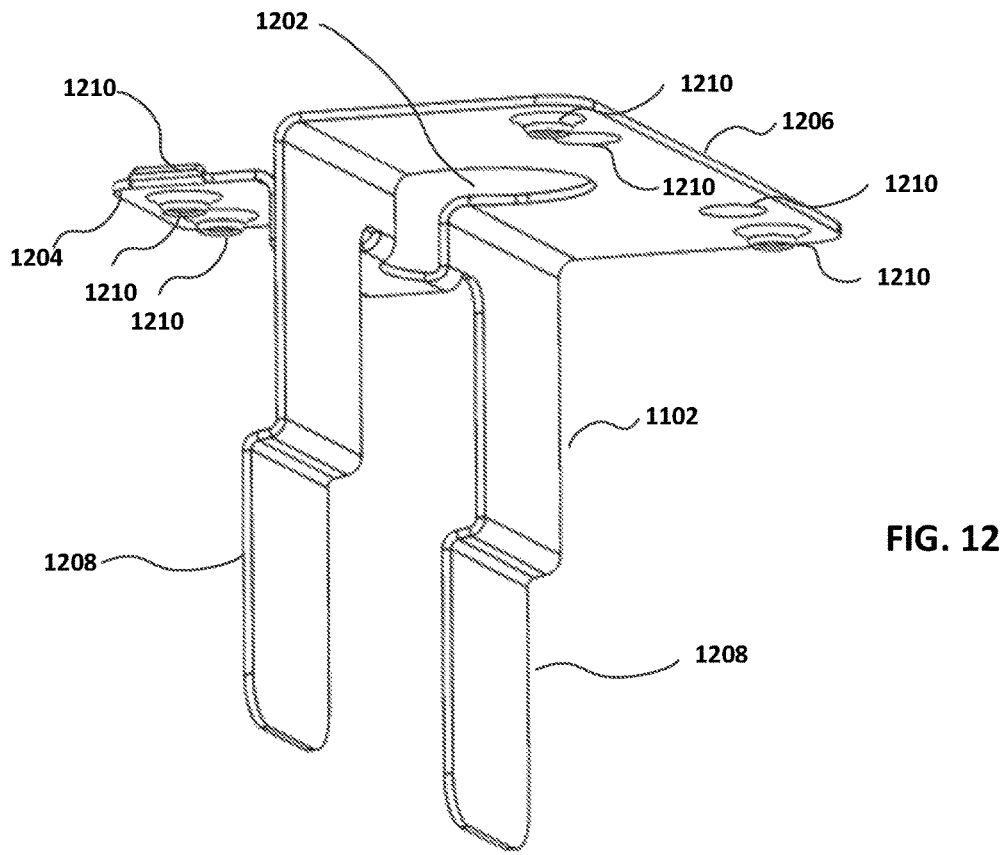
FIG. 12
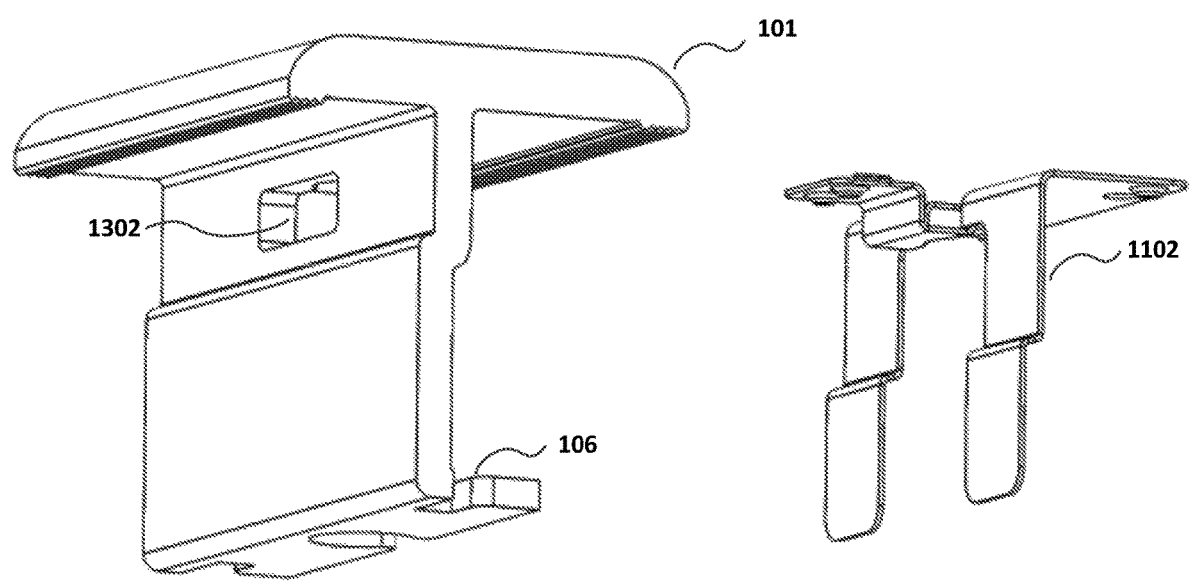
FIG. 13
FIG. 14

TWIST-LOCK SOLAR MODULE CLAMP

CROSS-REFERENCE TO RELATED APPLICATION

This application claims the benefit of, and priority to, U.S. Provisional Patent Application No. 62/940,119, filed on Nov. 25, 2019, entitled "TWIST-LOCK SOLAR MODULE CLAMP," the full disclosure of which is hereby expressly incorporated by reference in its entirety.

BACKGROUND

Current solar mounting solutions using rails as mounting structure use clamps to secure a solar module to the rail that can be cumbersome to install. Often, there is no securing mechanism to hold the clamp into the rail prior to the solar module being installed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be limiting of its scope, the principles herein are described and explained with additional specificity and detail through the use of the accompanying drawings in which:

FIGS. 12 and 14 illustrate isometric views of a bonding strap;
FIG. 13 illustrates an isometric view of a top clamp.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1A:
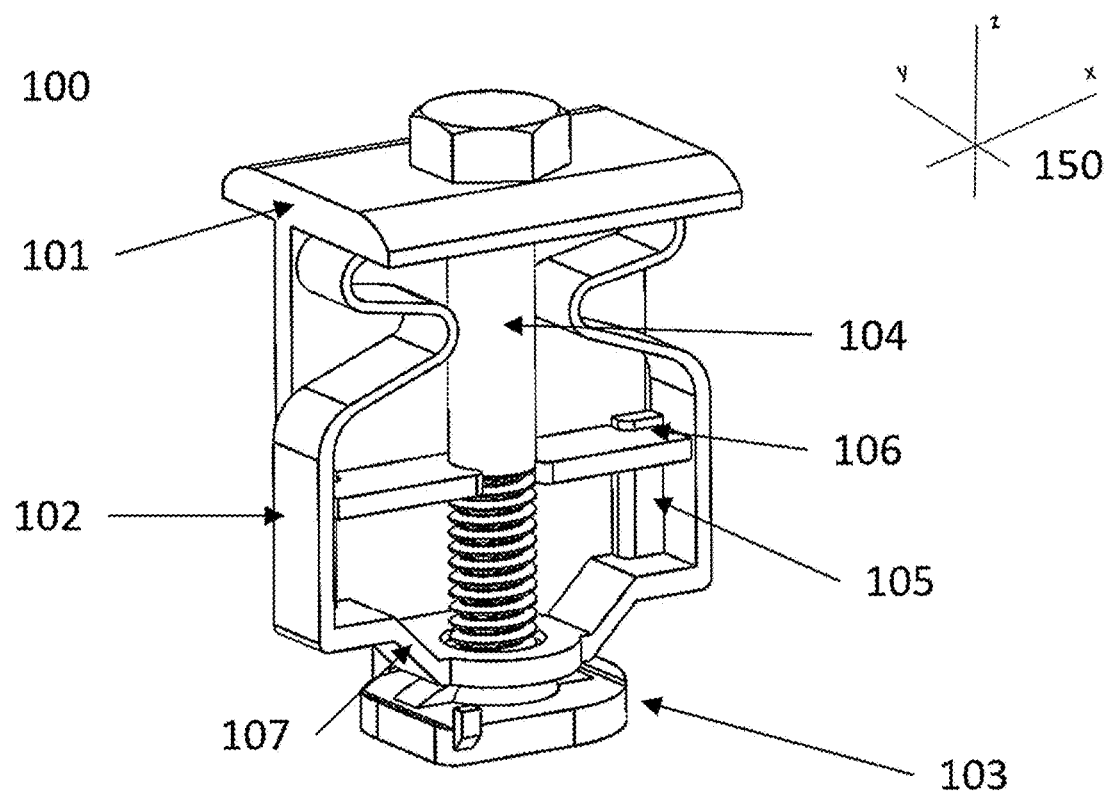
FIG. 1A illustrates an isometric view of a Clamp.

FIG. 1A depicts an isometric view of the Clamp 100. The Clamp 100 is an assembly of a Top Clamp 101, a Spring 102, a T-nut 103, and a fastener 104. The Clamp 100 is oriented in the X, Y, and Z cartesian coordinate planes 150. The fastener 104 extends through one or more apertures in the Top Clamp 101, an aperture in Spring 102, and threadably engages with T-nut 103; thereby securing all components together. Spring 102 has Ribs 105 that pass-through Rib Apertures 106 in the Top Clamp 101. The interference of Ribs 105 and Rib Apertures 106 in the X and Y direction hold the Spring 102 and Top Clamp 101 in substantially the same rotational orientation around the fastener 104 if either or both the Spring 102 or Top Clamp 101 are rotated around the fastener 104. The Ribs 105 and Rib Apertures 106 may not interfere in the Z direction so as to allow the Top Clamp 101 to compress the Spring 102 and move in the negative Z direction toward the T-nut 103 while the Spring 102 remains in substantially the same position along the Z axis. Spring 102 may have an Angled Protrusion 107. The Angled Protrusion 107 may be symmetric along the central Y-plane of the Spring 102, or it may be asymmetric. The Angled Protrusion 107 may have a flat angular surface as shown, or a curved surface. Top Clamp 101, fastener 104, and T-nut 103 may be constructed of an aluminum alloy, stainless steel alloy, carbon steel alloy, or another material with suitable strength properties. Spring 102 may be constructed using a polymer, with ultraviolet (UV) resistance and fire resistant properties.

Figure 1B:
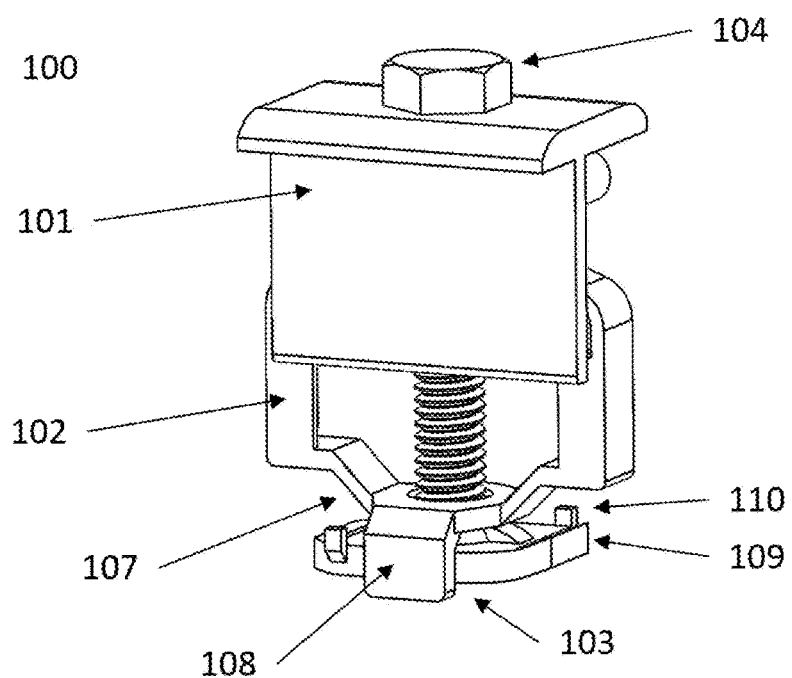
FIG. 1B illustrates a second isometric view of a Clamp.

FIG. 1B depicts a backside isometric view of Clamp 100. In this example embodiment, the Top Clamp 101 extends down in the negative Z direction and is outside of the Spring 102. Spring 102 may have one or more Spring Flanges 108 that engage with the T-nut 103 such that when the Spring 102 is rotated about the main axis of the fastener 104, the T-nut 103 rotates substantially the same amount. In this example embodiment, one Spring Flange 108 is shown to protrude down and rests substantially coincident with a side of the T-nut. T-nut 103 may have one or more T-nut Flanges 109 that protrude upward at a determined angle. The T-nut Flanges 109 may be similarly shaped and angled on the opposing edges of the T-nut 103. The T-nut 103 may have one of more Stop Flanges 110 that protrude upward in the positive Z direction. The T-nut 103 may have one or more ridges along the top surface near the T-nut Flanges 109 that can pierce a coating on a Rail 200, such as anodization or paint, such that the T-nut 103 electrically bonds with the Rail 200.

Figure 1C:
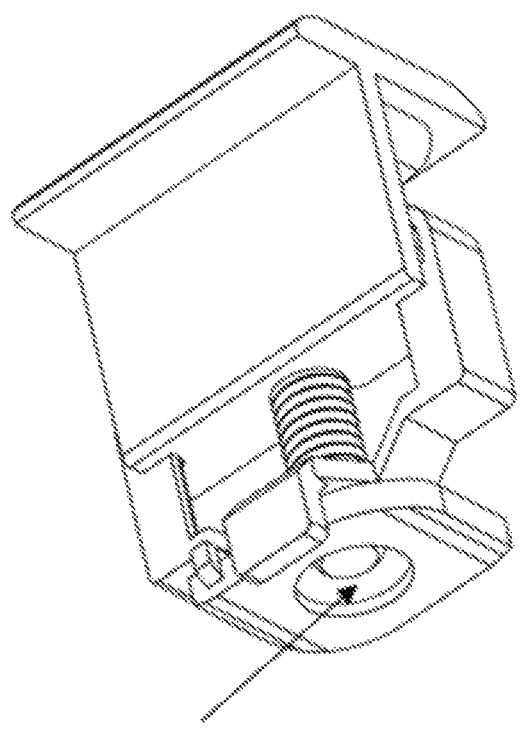
FIG. 1C illustrates a third isometric view of a Clamp.

FIG. 1C depicts an underside isometric view of Clamp 100. In this example embodiment of the present invention, the T-nut has a Cone Embossment 111 formed into the T-nut 103 that provides additional threads in the T-nut 103 for the fastener 104 to threadably engage.

Figure 2A:
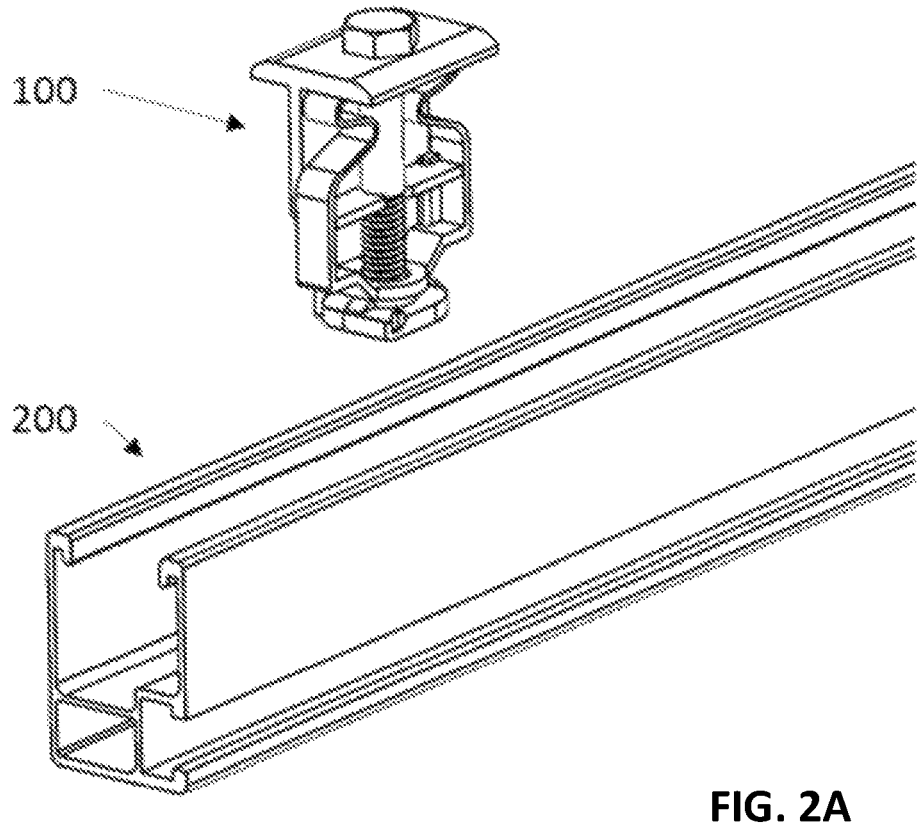
FIGS. 2A-2D illustrate the installation steps of a Clamp into a Rail.

FIG. 2A depicts an isometric view of the Clamp 100 positioned over a representative section of Rail 200. In this first step representing the installation of Clamp 100 into Rail 200, the Clamp 100 is oriented with the long side of T-nut 103 substantially parallel with the length of the Rail 200.

Figure 2B:
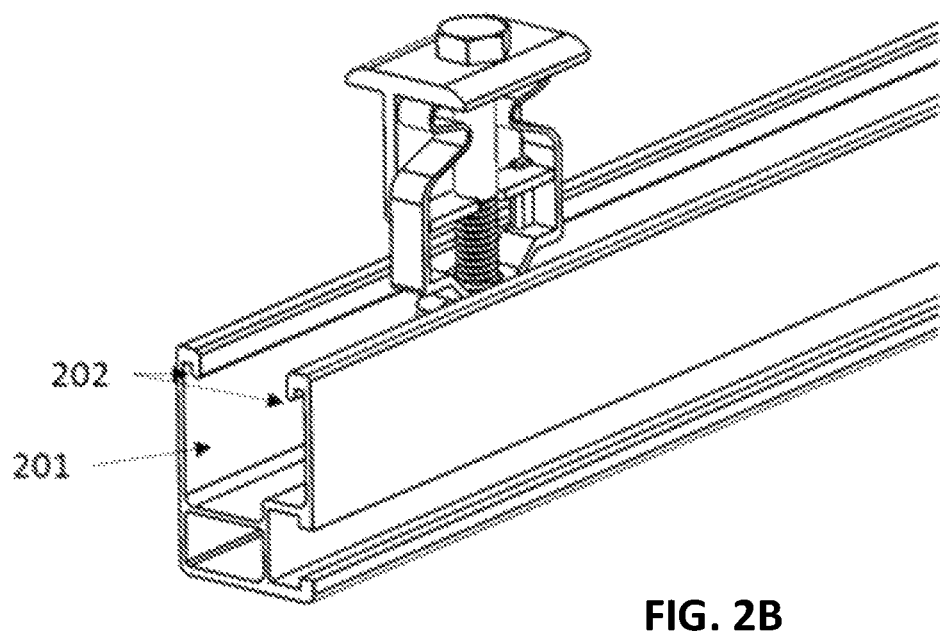

FIG. 2B depicts a second step of the installation of the Clamp 100 into the Rail 200. In this example embodiment, the Clamp 100 has been partially inserted into the Rail Channel 201. In this example, the Clamp 100 has not been rotated around the primary axis of the fastener 104. The T-nut is positioned below the Rail Prongs 202 of the Rail 200.

Figure 2C:
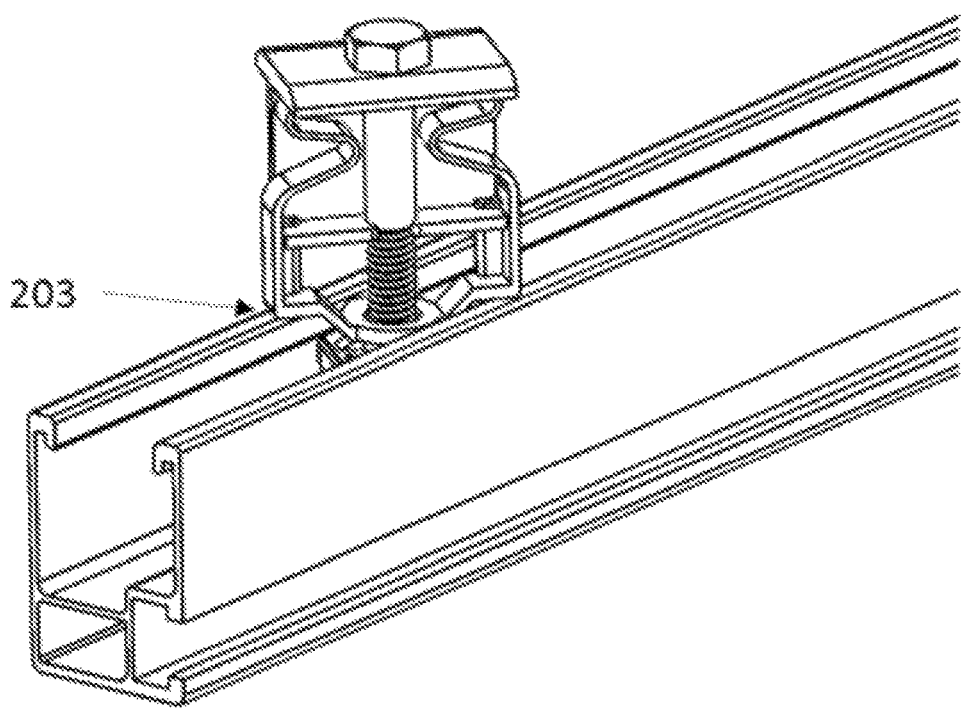

FIG. 2C depicts a third step of the installation of Clamp 100 into the Rail 200. In this example next step, the Clamp 100 is rotated substantially around the primary Z axis of the fastener 104. The T-nut rotates below the Rail Prongs 202, and the Angled Protrusion 107 engages with the top edges of the Rail 200, as shown in position 203. As the Angled Protrusion 107 is engaged against the top of the Rail 200, the Spring 102 compresses the Top Clamp 101 upward, thereby forcing up the T-nut 103 to engage with the Rail Prongs 202.

Figure 2D:
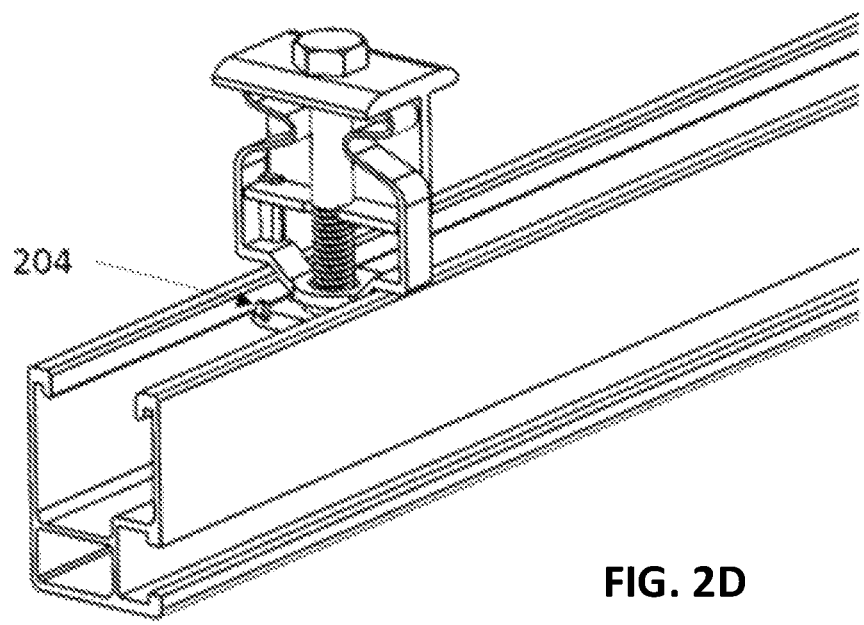

FIG. 2D depicts a final fourth step in the installation of Clamp 100. In this example next step, the Clamp 100 has been rotated substantially 90 degrees relative to its initial position. The Angled Protrusion 107 is fully engaged with the top edge or the Rail 200. Stop Flanges 110 may interfere with the inside edge of the Rail 200 as shown in position 204 to prevent the Clamp 100 from rotating further.

Figure 3A:
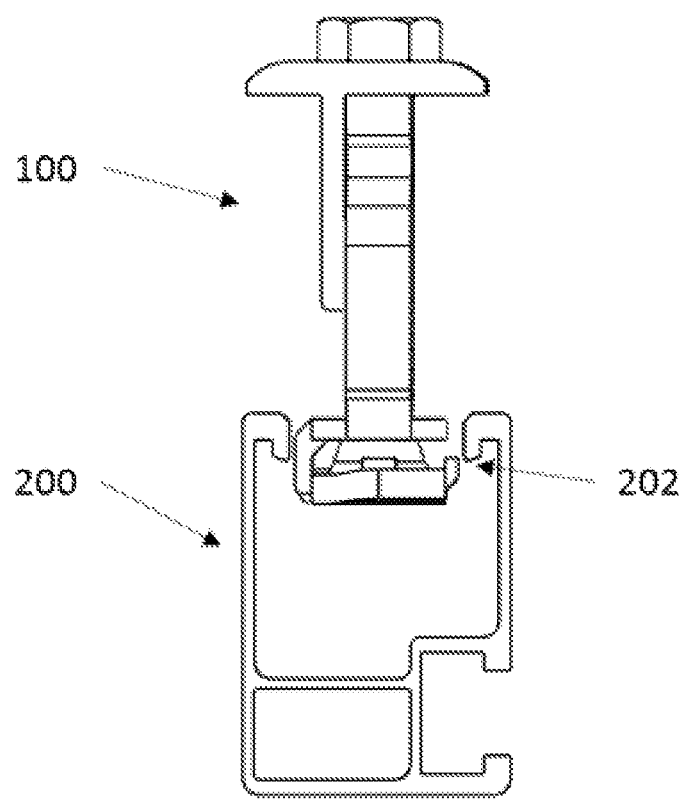
FIGS. 3A-3D illustrate an end view of the installation steps of a Clamp into a Rail.

FIGS. 3A-3D depict an end view of the same installation process as described and shown in FIGS. 2A-2D. FIG. 3A depicts an end view of FIG. 2B where the Clamp 100 is partially inserted into the open channel of Rail 200. The T-nut 103 is positioned slightly below the lower points of the Rail Prongs 202. In this example step of the installation, the long side of the Clamp 100 is parallel with the long edge of the Rail 200 in either the X or Y directions.

Figure 3B:
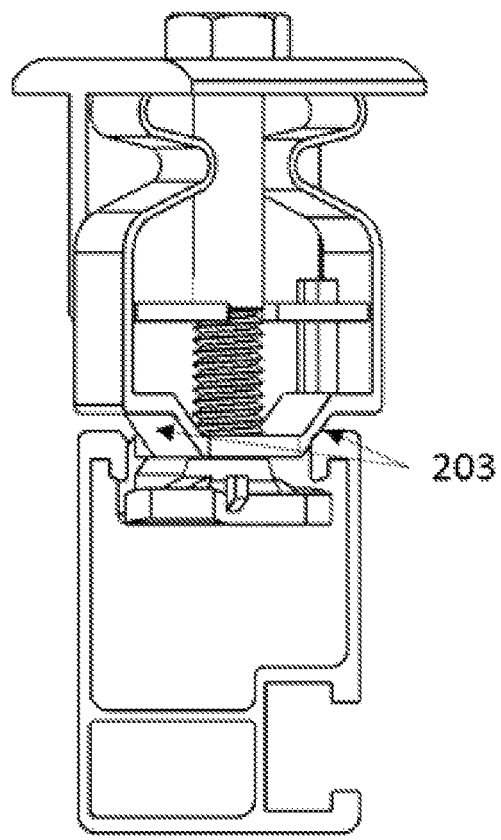

FIG. 3B depicts an end view of FIG. 2C. In this example next step, the Clamp 100 is rotated substantially around the primary Z axis of the fastener 104. The T-nut rotates below the Rail Prongs 202, and the Angled Protrusion 107 engages with the top edges of the Rail 200, as shown in position 203. As the Angled Protrusion 107 is engaged against the top of the Rail 200, the Spring 102 compresses the Top Clamp 101 upward, thereby forcing up the T-nut 103 to engage with the Rail Prongs 202.

Figure 3C:
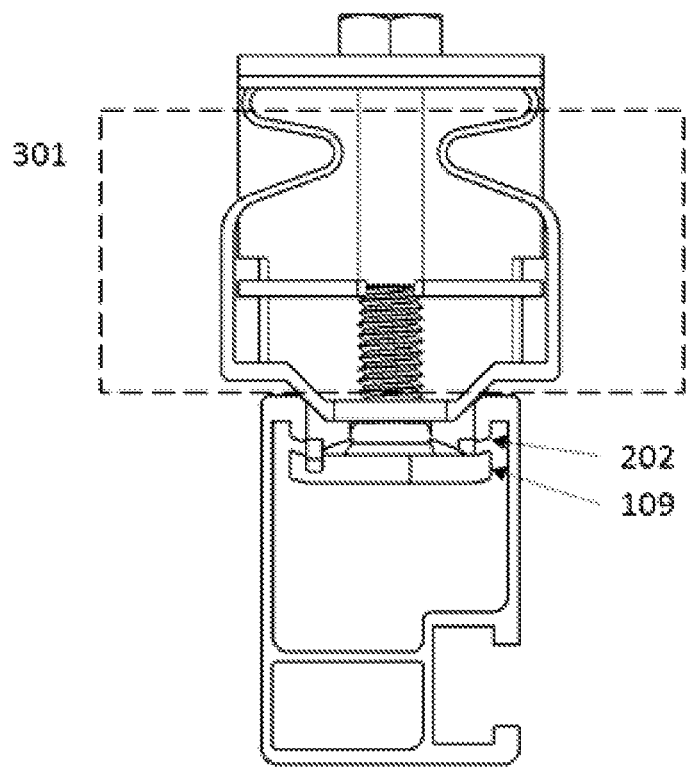

FIG. 3C depicts an end view of the step between FIGS. 2C and 2D wherein the Clamp 100 has rotated substantially 90 degrees from its original position and the Spring 102 is engaged with the top edges of the Rail 200, but the Spring 102 is still compressed down such that the T-nut is not yet engaged with the Rail 200 at the Rail Prongs 202. In this example embodiment, it is shown how the inside top edges of the Rail 200 are chamfered to a similar angle as the Angled Protrusion in order to coincide. A representative dimension of a Solar Module 301 is shown being positioned between the Top Clamp 101 and the top edge of the Rail 200.

Figure 3D:
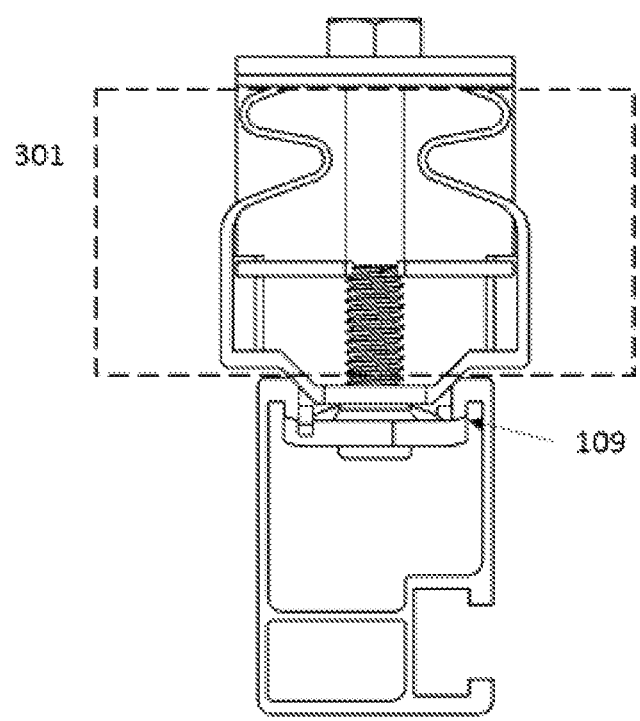

FIG. 3D depicts an end view of FIG. 2D. In this example next step, the Clamp 100 has been rotated substantially 90 degrees relative to its initial position. The Angled Protrusion 107 is fully engaged with the top edge or the Rail 200. Stop Flanges 110 may interfere with the inside edge of the Rail 200 as shown in position 204 to prevent the Clamp 100 from rotating further. The T-nut Flanges 109 engage with the Rail Prongs 202 to prevent the T-nut 103 from rotating loose after installation, and to prevent the top edges of the Rail 200 from buckling outward upon being loaded in the Z direction. A representative dimension of a Solar Module 301 is shown being clamped between the Top Clamp 101 and the top edge of the Rail 200 upon the fastener 104 being threadably engaged with the T-nut 103.

Figure 4A:
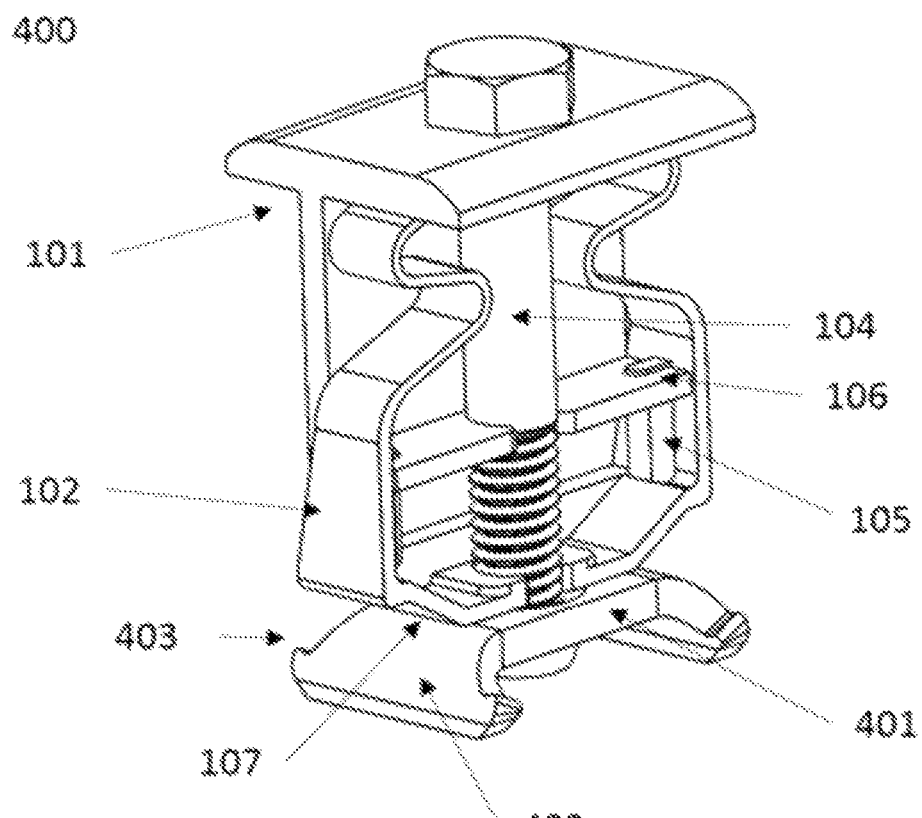
FIGS. 4A-4C illustrate an isometric view of a first alternative embodiment of a Clamp.

FIGS. 4 through 6 show a first alternative embodiment of the present invention. FIG. 4A depicts an isometric view of the Channel Clamp 400. The Channel Clamp 400 is an assembly of a Top Clamp 101, a Spring 102, a Channel Nut 401, and a fastener 104. The Channel Clamp 400 is oriented in the X, Y, and Z cartesian coordinate planes 150. The fastener 104 extends through one or more apertures in the Top Clamp 101, an aperture in Spring 102, and threadably engages with Channel Nut 401; thereby securing all components together. Spring 102 has Ribs 105 that pass-through Rib Apertures 106 in the Top Clamp 101. The interference of Ribs 105 and Rib Apertures 106 in the X and Y direction hold the Spring 102 and Top Clamp 101 in substantially the same rotational orientation around the fastener 104 if either or both the Spring 102 or Top Clamp 101 are rotated around the fastener 104. The Ribs 105 and Rib Apertures 106 may not interfere in the Z direction so as to allow the Top Clamp 101 to compress the Spring 101 and move in the negative Z direction toward the Channel Nut 401 while the Spring 102 remains in substantially the same position along the Z axis. Spring 102 may have an Angled Protrusion 107. The Angled Protrusion 107 may be symmetric along the central Y-plane of the Spring 102, or it may be asymmetric. The Angled Protrusion 107 may have a flat angular surface as shown, or a curved surface.

Figure 4B:
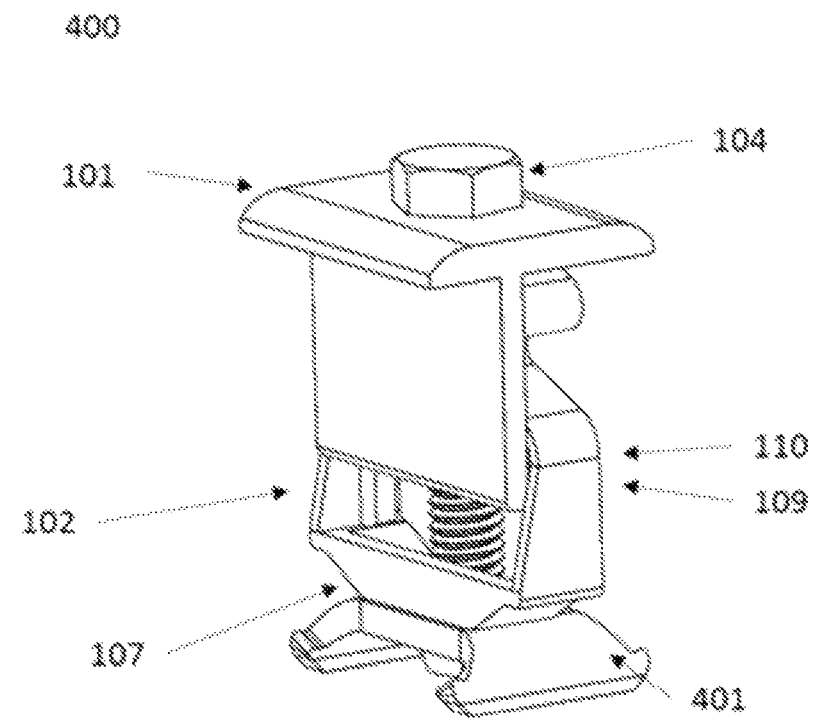

FIG. 4B depicts a backside isometric view of Channel Clamp 400. Channel Nut 401 may have one or more Nut Flanges 402 with one or more Nut Prongs 403 on the outer corners of the Nut Flanges 402. In this example embodiment, the Nut Prongs 403 are shaped to substantially contour Rail Prongs 202. The top faces of Nut Prongs 403 may be at an angle relative to the X-Y plane such that one contoured edge is in a higher position along the Z axis relative to the other top edge of the contour. The top edge will present a sharp engagement with the Rail Prongs 202 in order to pierce a coating of the Rail 200, such as anodization or paint, in order to provide an electrical bonding path between the Channel Nut 401 and the Rail 200. Channel Nut 401 may be constructed of an aluminum alloy, stainless steel alloy, carbon steel alloy, or another material with suitable strength properties.

Figure 4C:
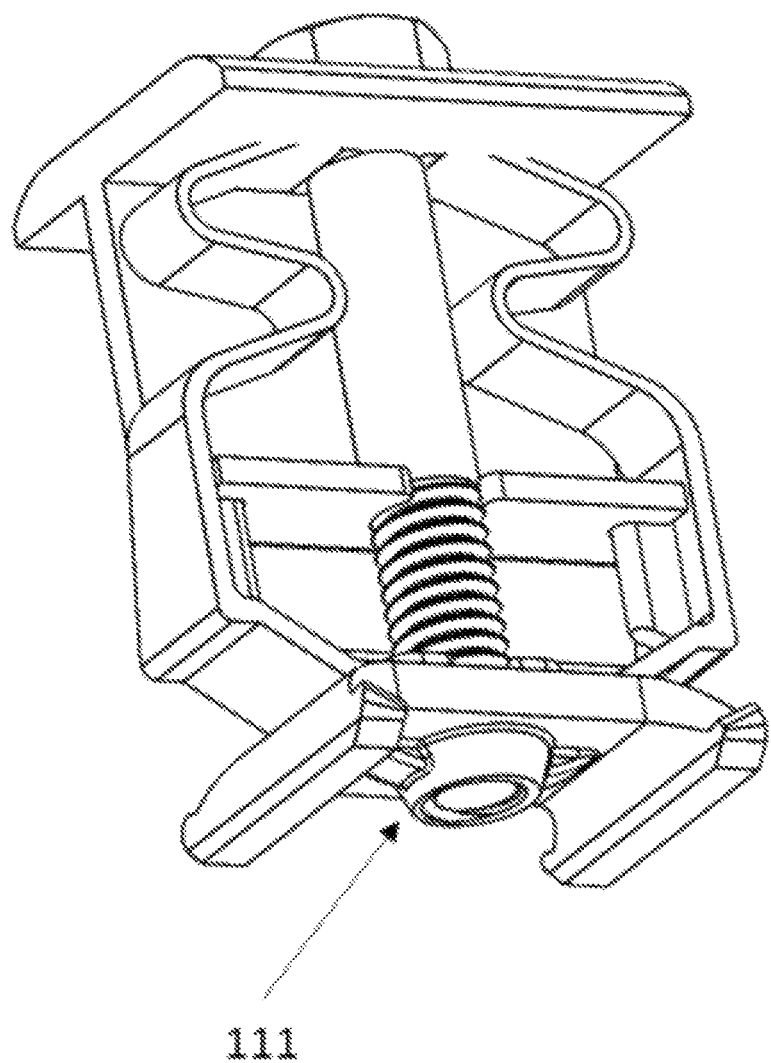

FIG. 4C depicts an underside isometric view of Channel Clamp 400. In this example embodiment of the present invention, the Channel Nut 401 has a Cone Embossment 111 formed into the Channel Nut 401 that provides additional threads in the Channel Nut 401 for the fastener 104 to threadably engage.

Figures 5A, 5B, 5C, 5D, 5E:
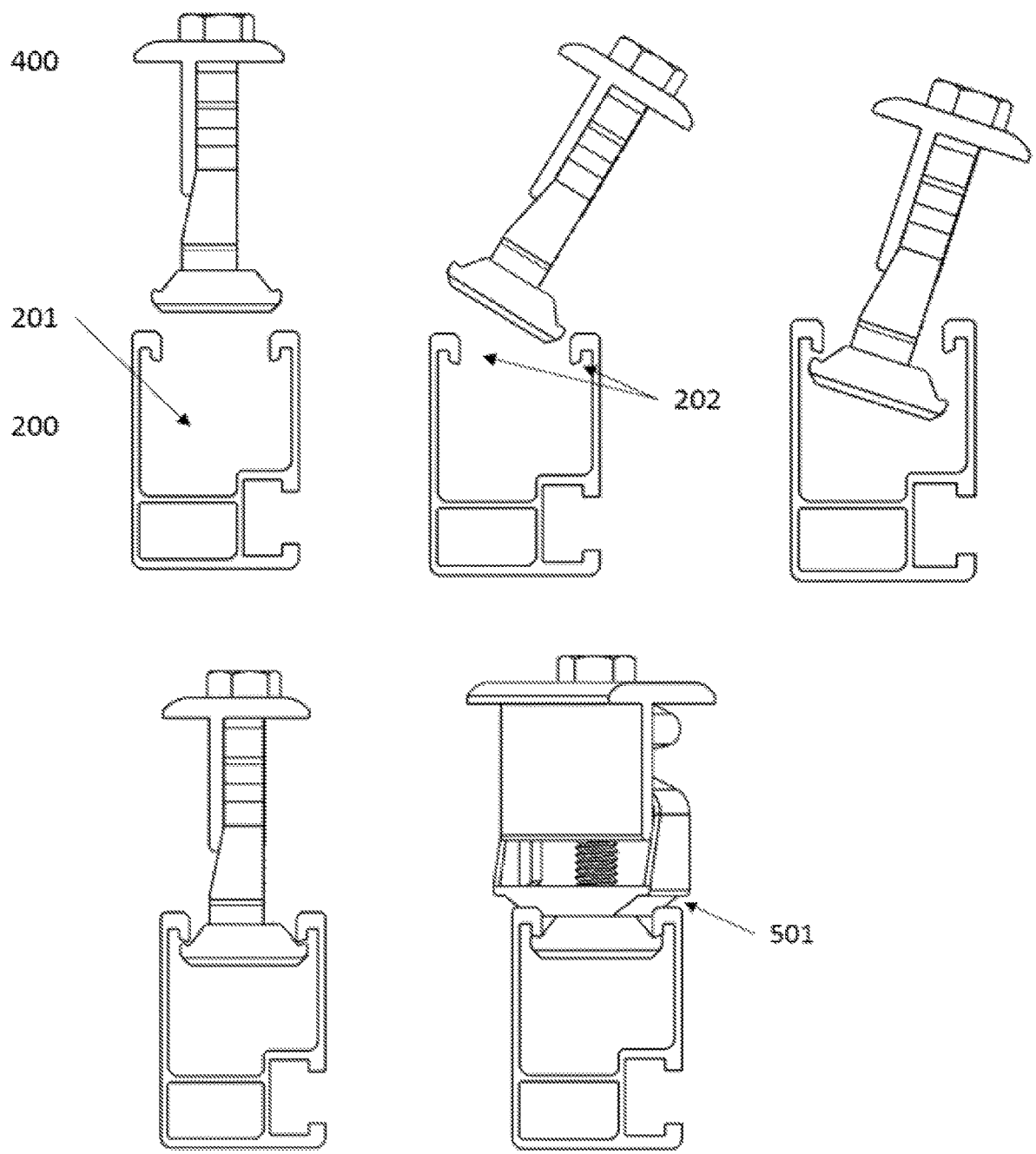
FIGS. 5A-5F illustrate the installation steps of a Clamp into a Rail.

FIGS. 5A through 5F depict the end view of the installation steps for the Channel Clamp 400 into a Rail 200. FIG. 5A depicts the Channel Clamp 400 positioned over the Rail Channel 201 of the Rail 200. FIG. 5B depicts the Channel Clamp 400 angled to allow the Channel Nut 401 to fit through the top edges of the Rail 200 and into the Rail Channel 201. FIG. 5C depicts the Channel Clamp 400 lowered into the Rail Channel 201 such that all the Nut Prongs 403 are below the bottom surface of the Rail Prongs 202. In this example embodiment, the Channel Clamp 400 has been angled back towards a vertical position slightly.

FIG. 5D depicts the Channel Clamp 400 angled back to a vertical position, and elevated upwards such that the Nut Prongs 403 engage with the Rail Prongs 202. FIG. 5E depicts the Top Clamp 101 and Spring 102 rotating about the primary axis of the fastener 104 whilst the Channel Nut 401 remains substantially stationary. As the Spring 102 is rotated about the primary axis of the fastener 104, the Angle Protrusion 107 engages with the top edges of the Rail 200 at position 501.

Figure 5F:
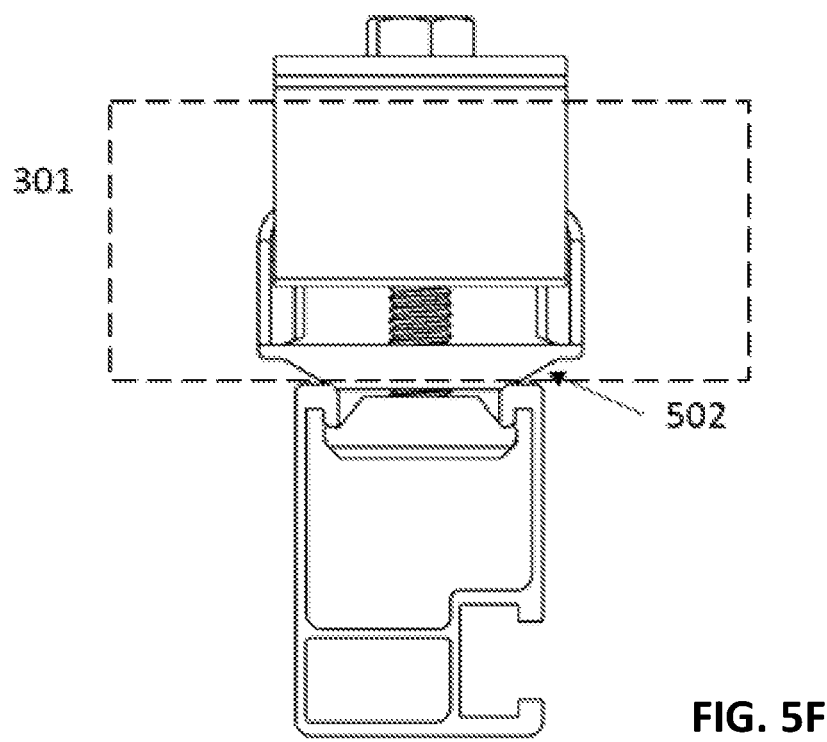

FIG. 5F depicts a final position where the Top Clamp 101 and Spring 102 have rotated substantially 90 degrees relative to the position in FIG. 5A. The Spring 102 is now fully engaged with the top edge of the Rail 200 at position 502. A representative dimension of a Solar Module 301 is shown being clamped between the Top Clamp 101 and the top edge of the Rail 200 upon the fastener 104 being threadably engaged with the Channel Nut 401.

Figure 6A:
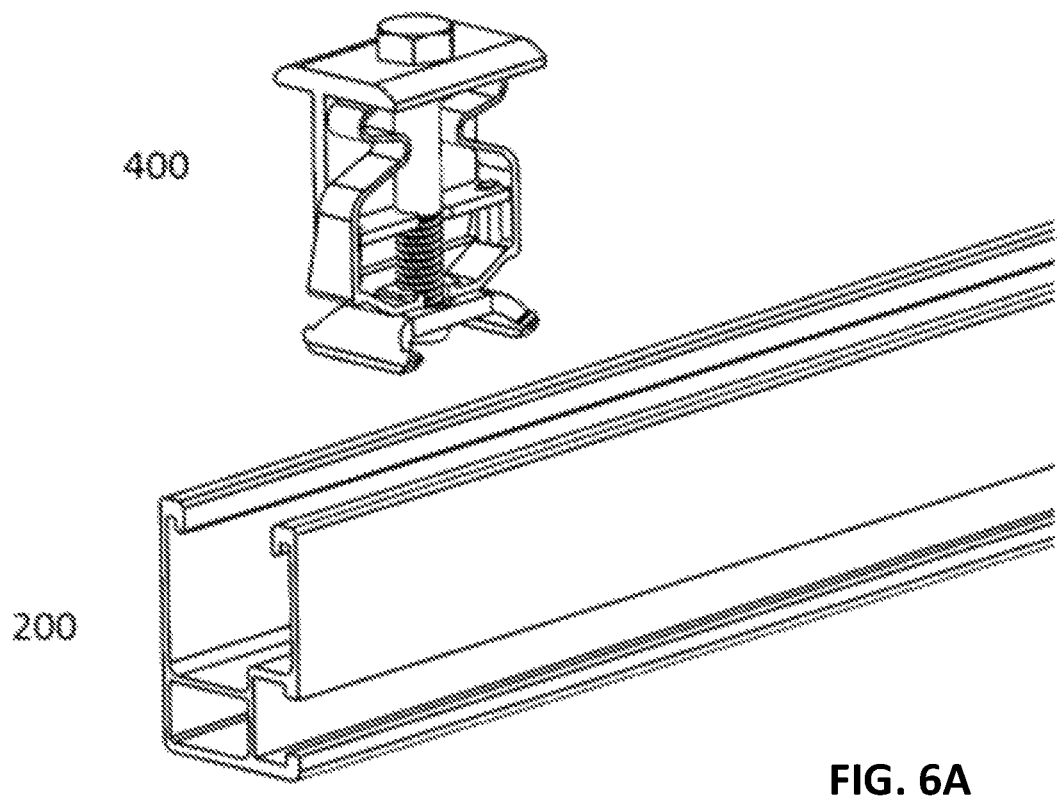
FIGS. 6A-6C illustrate an isometric view of the installation steps of a Clamp into a Rail.
Figure 6B:
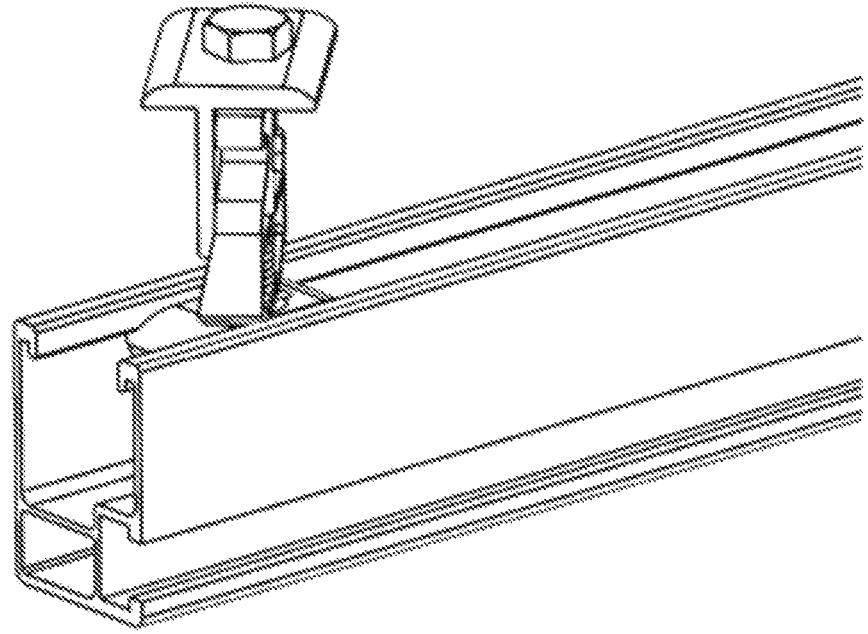
Figure 6C:
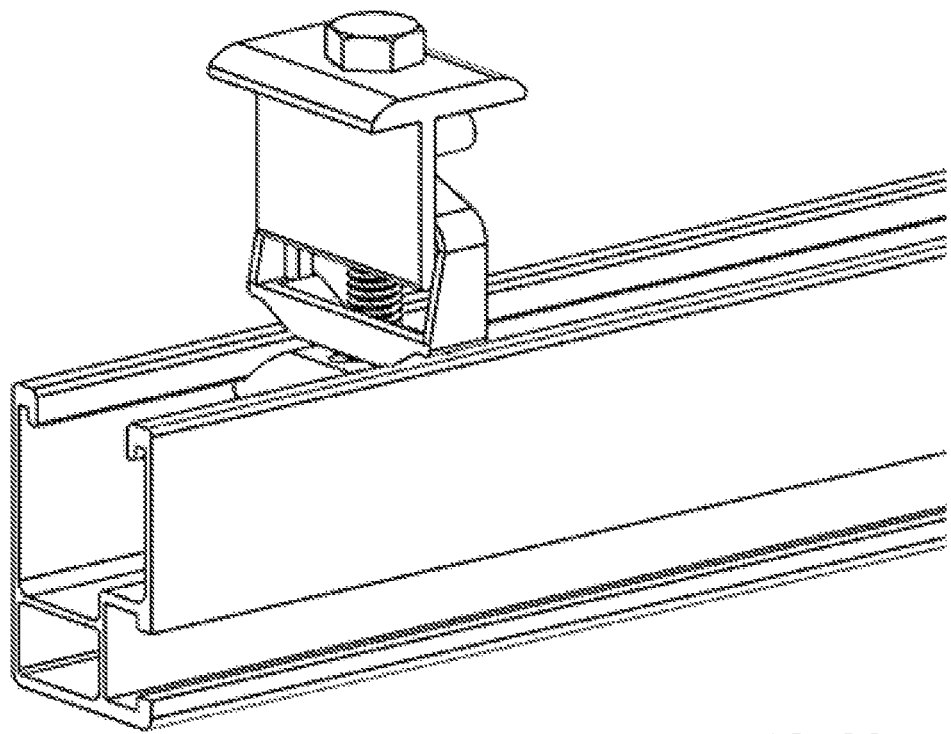

FIGS. 6A through 6C depict FIGS. 5A through 5F in an isometric view. FIG. 6A depicts FIG. 5A where the Channel Clamp 400 is position over the Rail 200. FIG. 6B depicts the FIG. 5E after the Channel Clamp 400 has been positioned inside the Rail 200, and the Top Clamp and Spring 102 are partially rotated about the primary axis of the fastener 104. In this position, the Angled Protrusion 107 of Spring 102 may have begun to engage with the top inside edges of Rail 200. FIG. 6C depicts an isometric view of FIG. 5F representing a final position of the Top Clamp 101 and Spring 102. The Angled Protrusion 107 may be shaped such that when fully engaged with a chamfer on the top inside edges of the Rail 200, the Top Clamp 101 and Spring 102 are held into a position substantially perpendicular to the length of the Rail 200.

Figure 7:
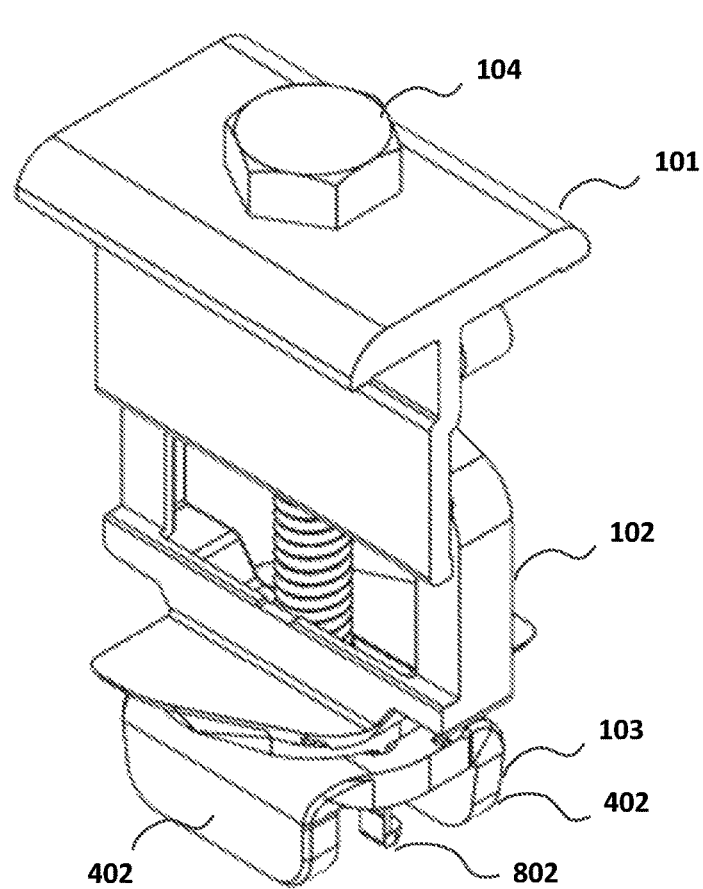
FIGS. 7 and 8 illustrate isometric views of a second alternative embodiment of a Clamp.
Figure 8:
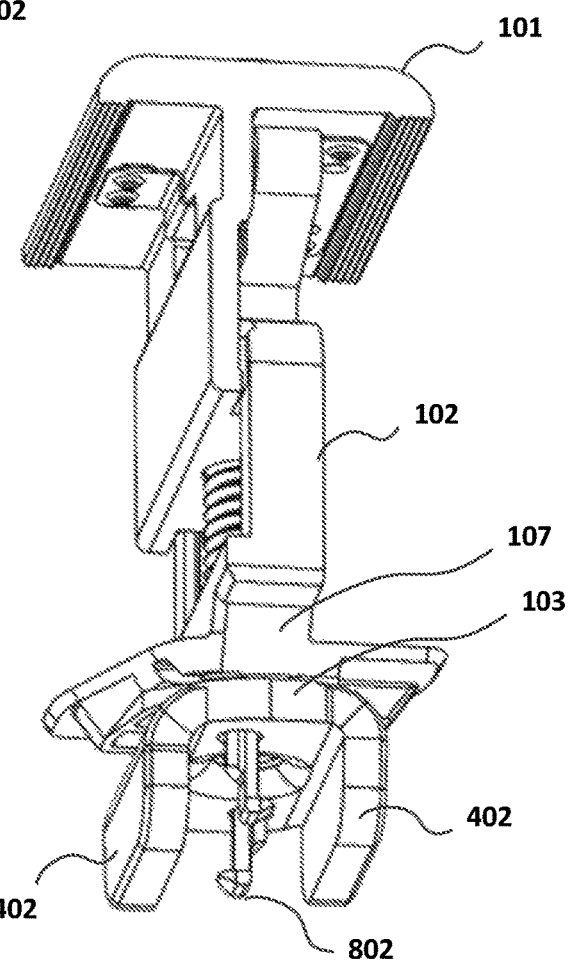
Figure 9:
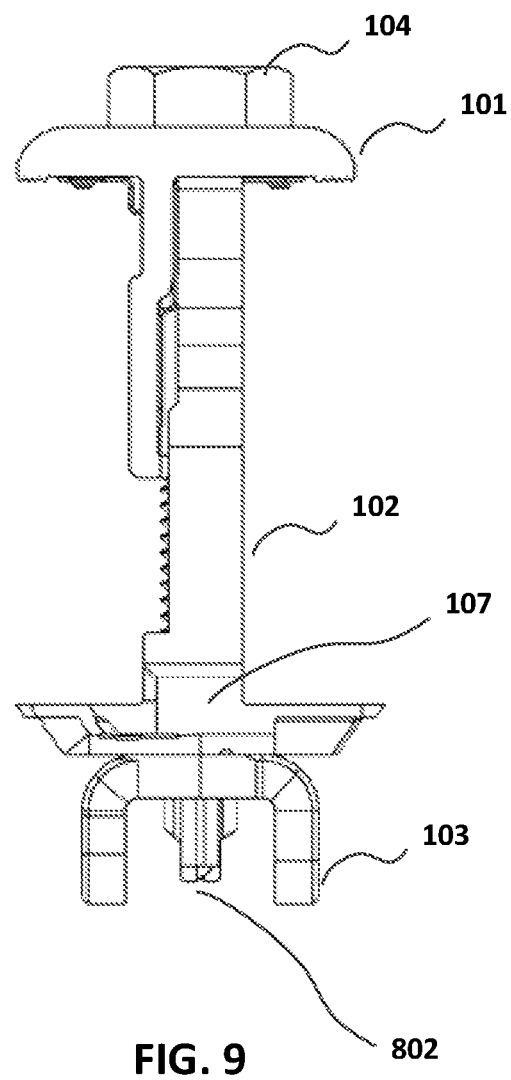
FIGS. 9 and 10 illustrate side and front views of a second alternative embodiment of a Clamp.
Figure 10:
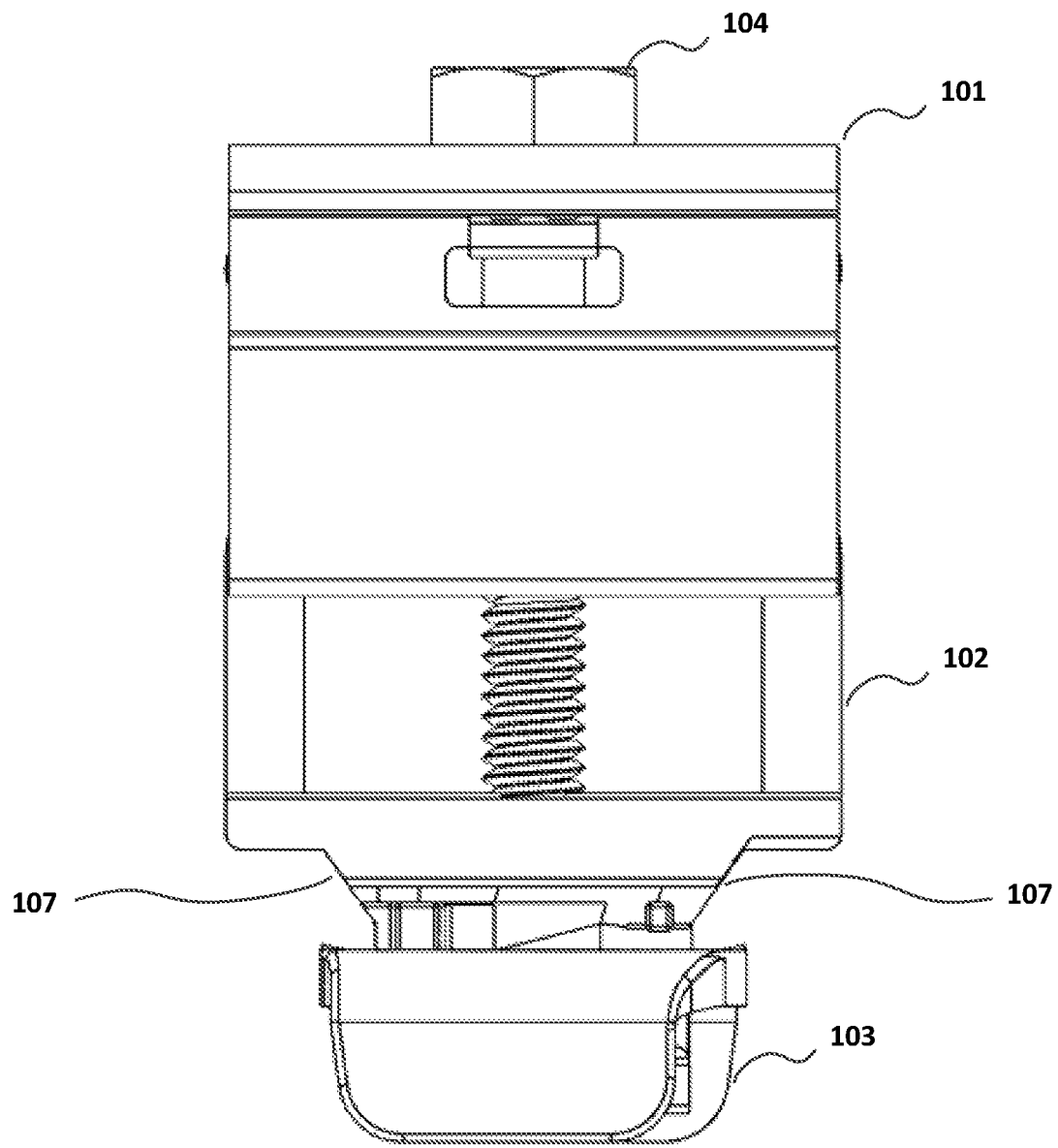
Figure 11:
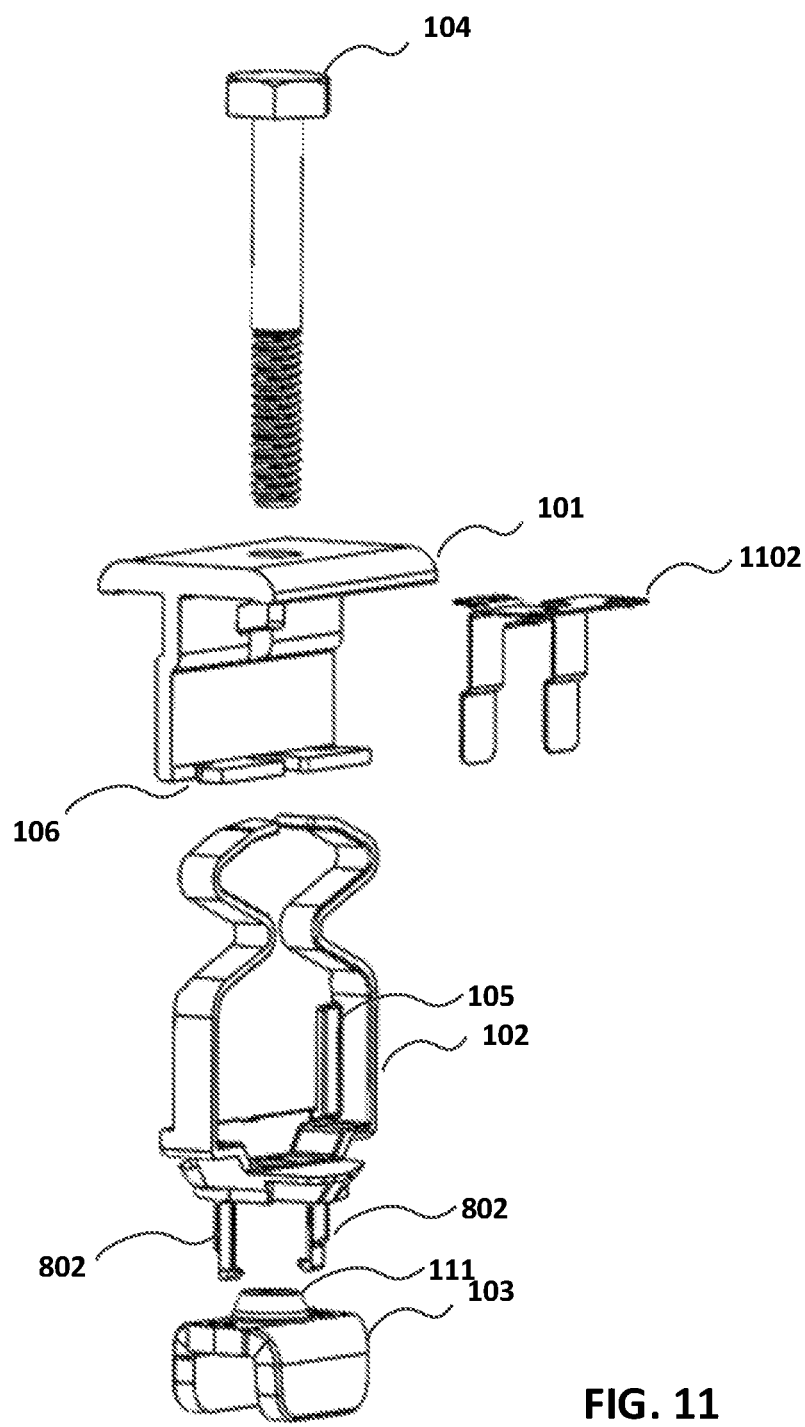
FIG. 11 illustrates an exploded view of a second alternative embodiment of a Clamp.
Figure 15:
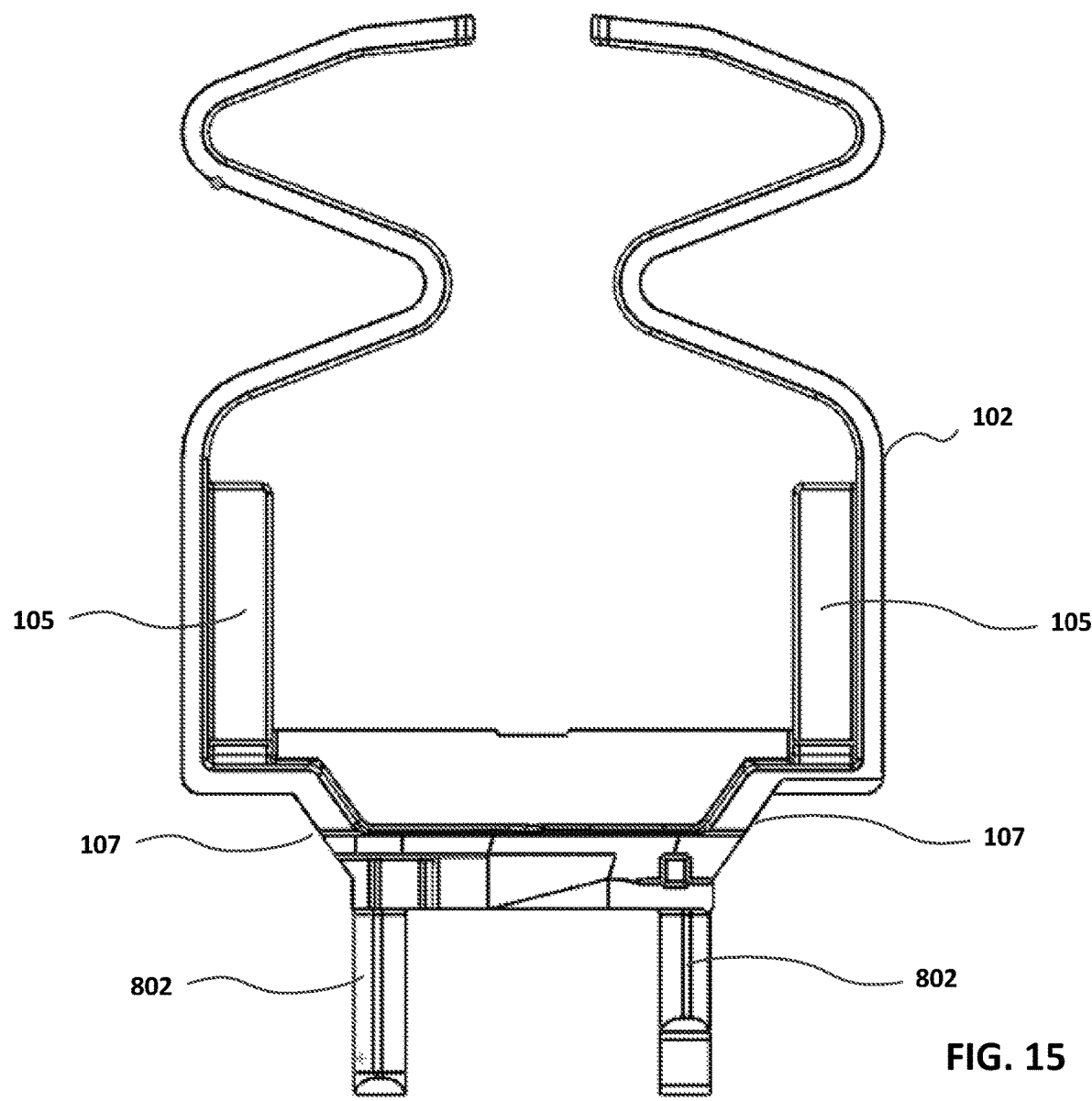
FIG. 15 illustrates a view of a spring in a second alternative embodiment of a Clamp.
Figure 16:
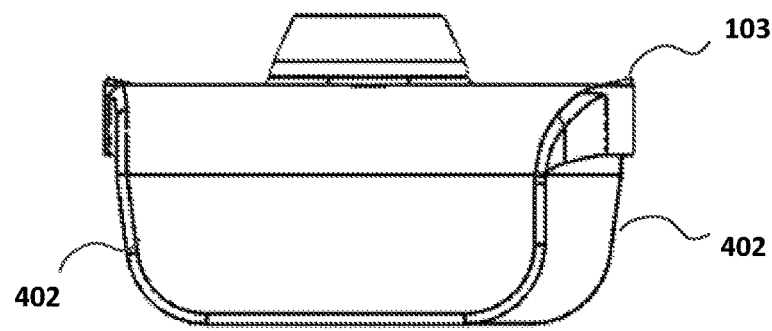
FIG. 16 illustrates a view of a T-nut in a second alternative embodiment of a Clamp.
Figure 17:
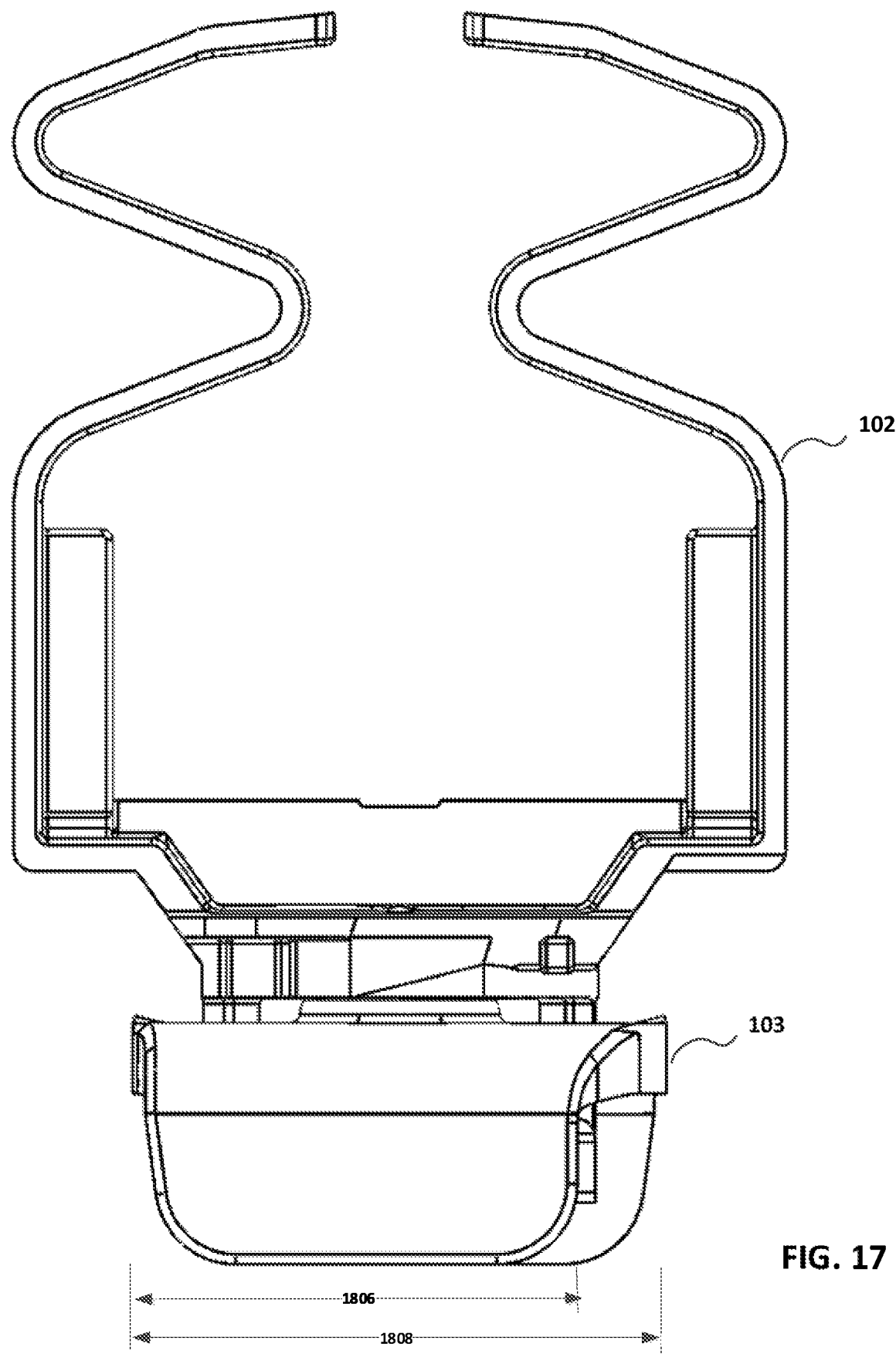
FIG. 17 illustrates a view of a spring and a T-nut in a second alternative embodiment of a Clamp.
Figure 18:
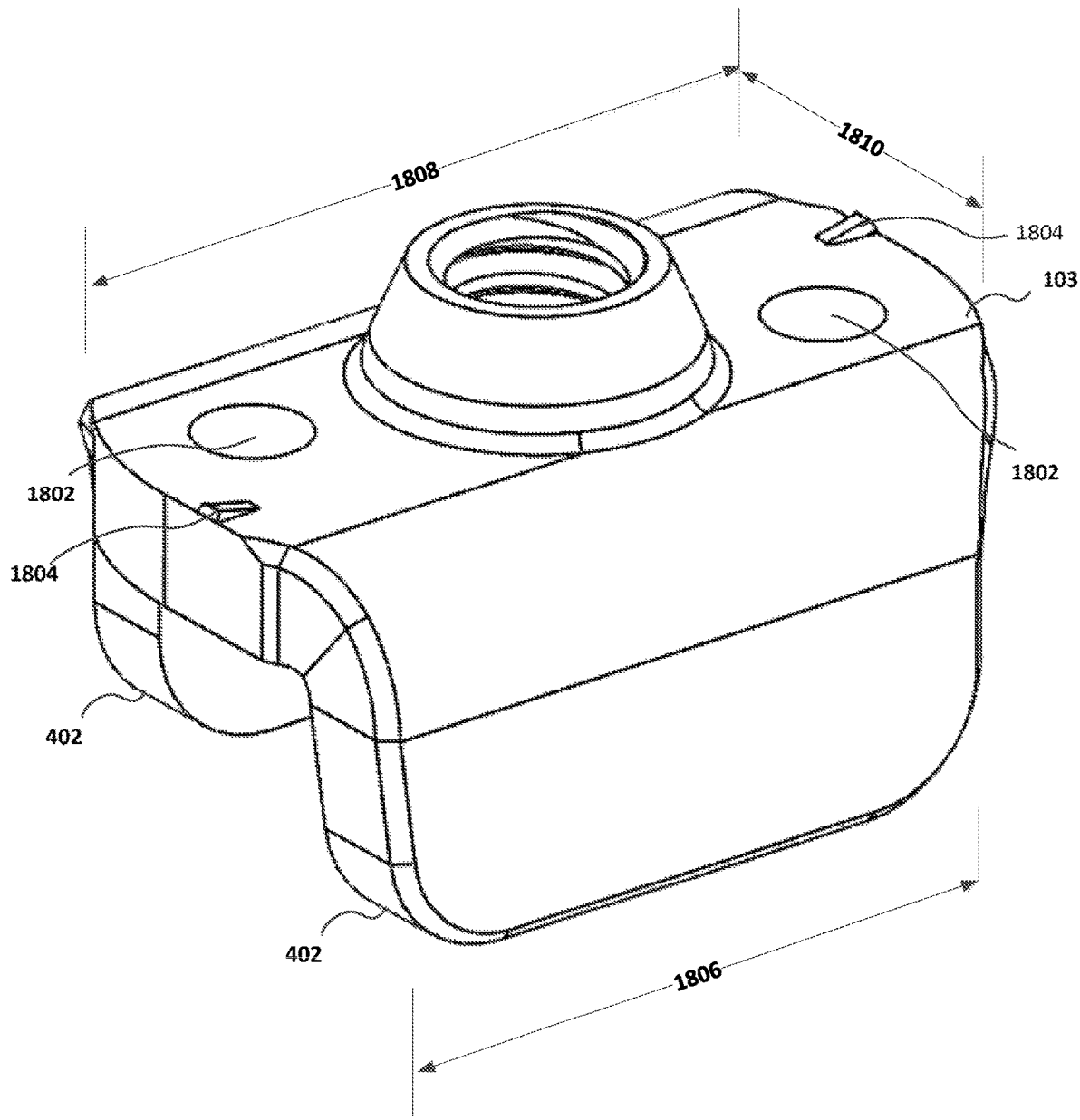
FIG. 18 illustrates an isometric view of a T-nut in a second alternative embodiment of a Clamp.
Figure 19:
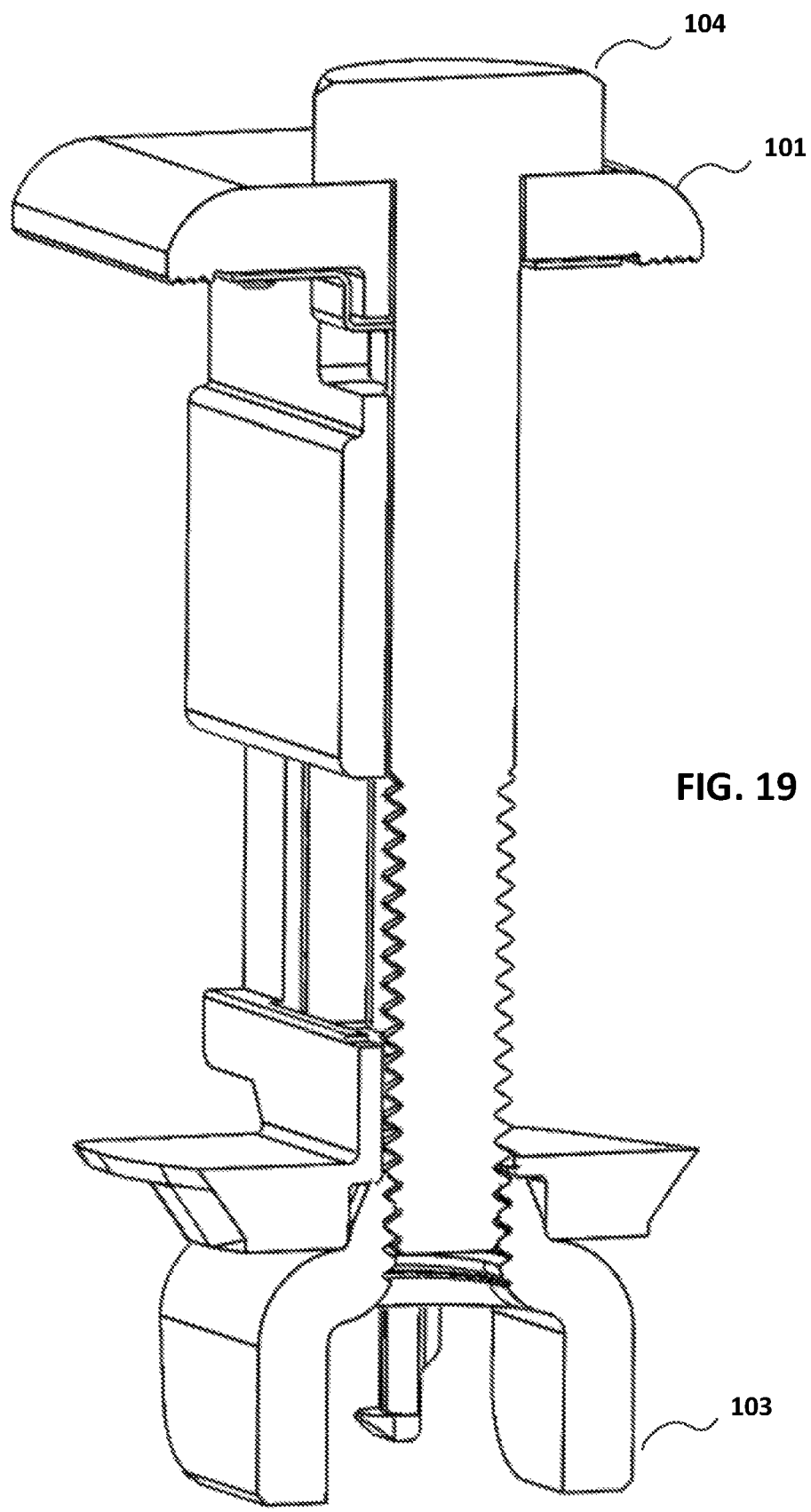
FIG. 19 illustrates a cross-section view in a second alternative embodiment of a Clamp.
Figure 20:
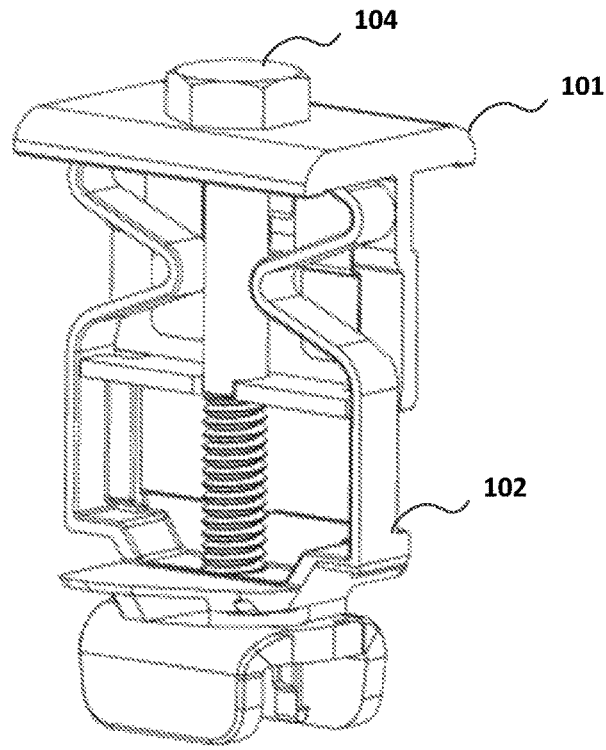
FIG. 20 illustrates an isometric view of a Clamp.

FIGS. 7-22 show examples of a second alternative embodiment of the present invention. FIG. 7 illustrates an isometric view of the twist-lock clamp 100. Twist-lock clamp 100 is an assembly of a Top Clamp 101, a Spring 102, a Bonding Clip 1102, a T-nut 103, and a fastener 104. The fastener 104 extends through one or more apertures in the Top Clamp 101, an aperture in Spring 102, an aperture in Bonding Clip 1102 and threadably engages with T-nut 103; thereby securing all components together. Spring 102 has Ribs 105 that pass-through Rib Apertures 106 in the Top Clamp 101. The interference of Ribs 105 and Rib Apertures 106 in the X and Y direction hold the Spring 102 and Top Clamp 101 in substantially the same rotational orientation around the fastener 104 if either or both the Spring 102 or Top Clamp 101 are rotated around the fastener 104. The Ribs 105 and Rib Apertures 106 may not interfere in the Z direction so as to allow the Top Clamp 101 to compress the Spring 102 and move in the negative Z direction toward the T-nut 103 while the Spring 102 remains in substantially the same position along the Z axis. Spring 102 may have an Angled Protrusion 107. The Angled Protrusion 107 may be symmetric along the central Y-plane of the Spring 102, or it may be asymmetric. The Angled Protrusion 107 may have a flat angular surface as shown, or a curved surface.

T-nut 103 may be constructed of an aluminum alloy, stainless steel alloy, carbon steel alloy, or another material with suitable strength properties. T-nut 103 has a Cone Embossment 111 formed into the T-nut 103 that provides additional threads for the fastener 104 to threadably engage.

In addition to the central threaded aperture in Cone Embossment 111, T-nut 103 also has laterally offset apertures 1802. These laterally offset apertures 1802 cooperate with nut snaps 802 in Spring 102. The cooperation of nut snaps 802 and laterally offset apertures 1802 hold the Spring 102 and T-nut 103 in substantially the same rotational orientation around the fastener 104. That cooperation also holds T-nut 103 and Spring 102 in relative position if fastener 104 and T-nut 103 become disconnected.

T-nut 103 has offset raised contact points 1804, which present a sharp engagement with Rail Prongs 202 in order to pierce a coating of the Rail 200, such as anodization or paint, in order to provide an electrical bonding path between T-nut 103 and Rail 200.

T-nut 103 has a top planar surface with a wide dimension 1808, and a narrow dimension 1810. The wide dimension 1808 of T-nut 103 is greater than the width between Rail Prongs 202 of Rail Channel 201. The narrow dimension 1810 of T-nut 103 is less than the width between Rail Prongs 202 of Rail Channel 201. The difference in dimensions 1808 and 1810 allow T-nut 103 to be inserted between Rail Prongs 202 of Rail Channel 201, and then when T-nut 103 is rotated 90 degrees, the T-nut 103 is captured in Rail Channel 201 by Rail Prongs 202. Nut Flanges 402 of T-nut 103 are also planar, and generally rectangular, having a dimension 1806 that is less than wide dimension 1808. Nut Flanges 402 are also offset so that one edge of Nut Flange 402 is generally aligned with a narrow edge of the top planar surface. This offset of Nut Flanges 402 allows T-nut 103 to rotate about 90 degrees when inserted in Rail Channel 201. Efforts to rotate T-nut 103 substantially beyond 90 degrees are prevented when the Nut Flanges 402 interfere with the walls of Rail Channel 201.

Figure 22:
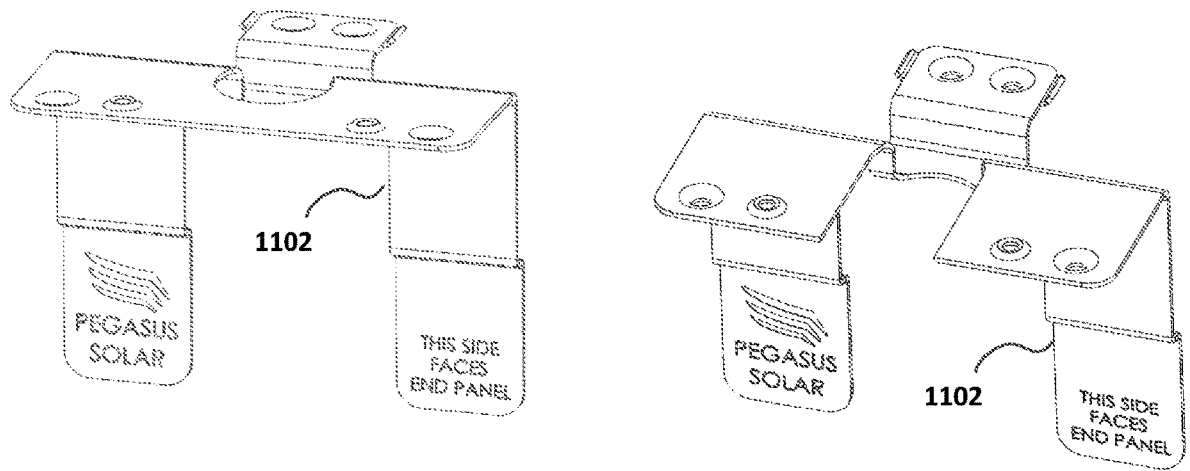
FIG. 22 illustrates two embodiments of a Bond Clip.

Bonding Clip 1102 has an aperture 1202, a first flange 1204, a second flange 1206, and a pair of third flanges 1208. Aperture 1202 allows fastener 104 to pass through. First flange 1204 can pass through aperture 1302 in Top Clamp 101. First and second flanges 1204 and 1206 have raised contact points 1210. The raised contact points 1210 are on both sides of second flange 1206. On first flange 1204, the raised contact points are also on both sides, although they may be different configurations. Bonding Clip 1102 may be constructed of a stainless steel alloy, carbon steel alloy, or another material with suitable strength properties. In general the strength properties of Bonding Clip 1102 are equal to or greater than the strength properties of Top Clamp 101. As illustrated in FIG. 22, Bonding Clip 1102 has labeling to indicate which side of the Clamp faces an end panel. FIG. 22 also illustrates two possible variations on the configuration of Bonding Clip 1102

Figure 21:
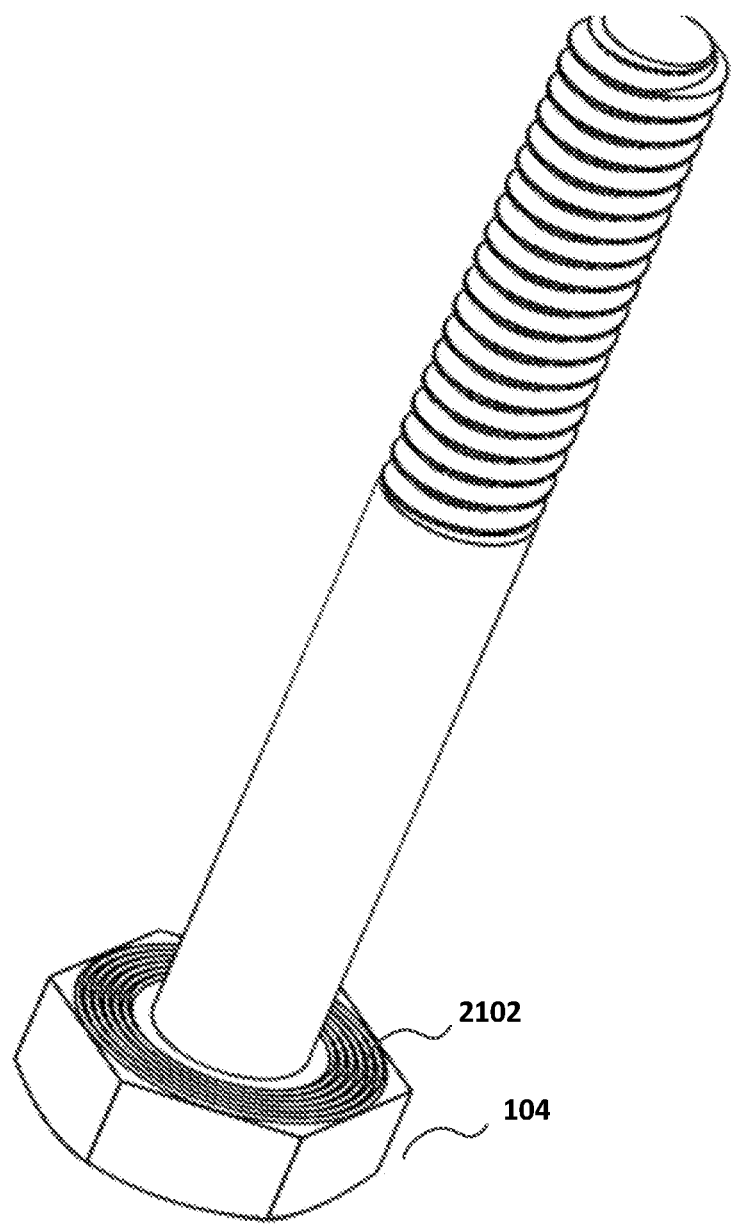
FIG. 21 illustrates a fastener.

As illustrated in FIG. 21, the under surface of fastener 104 has raised rings 2102 in order to pierce a coating of top clamp 101, such as anodization or paint, in order to provide an electrical bonding path between fastener 104 and top clamp 101.

FIG. 22 illustrates lettering on a bonding clip.

Figure 23:
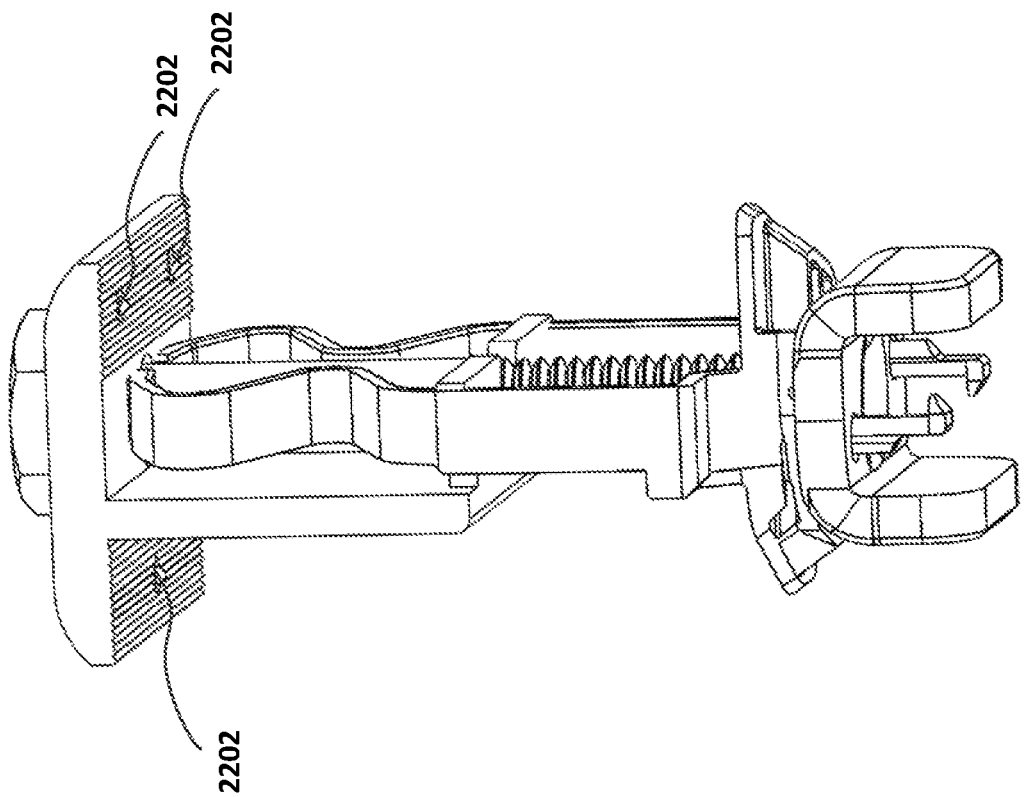
FIGS. 23 and 24 illustrate left and right isometric views in a third alternative embodiment of a Clamp.
Figure 24:
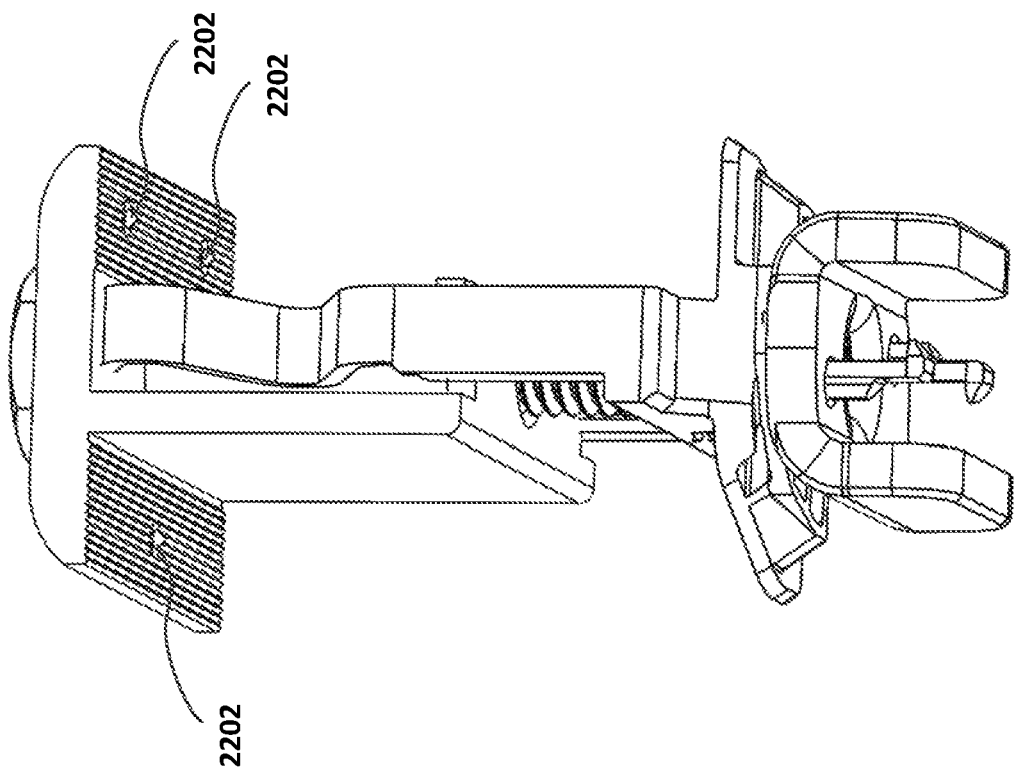
Figure 26:
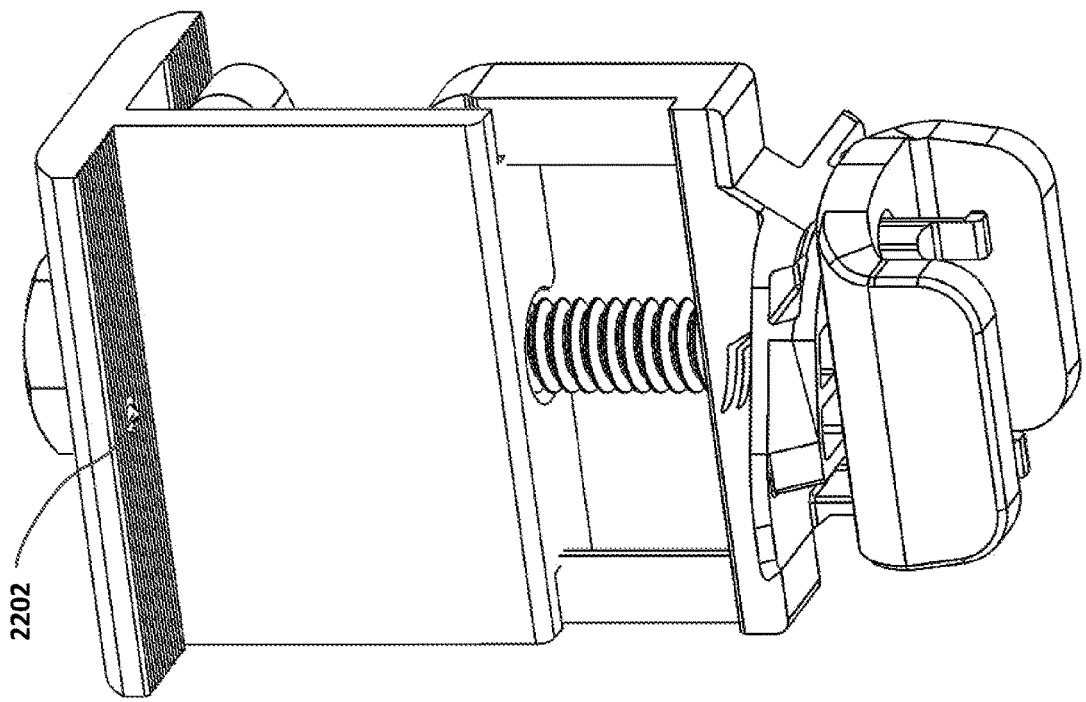
FIG. 26 illustrates an isometric view in a third alternative embodiment of a Clamp.
Figure 25:
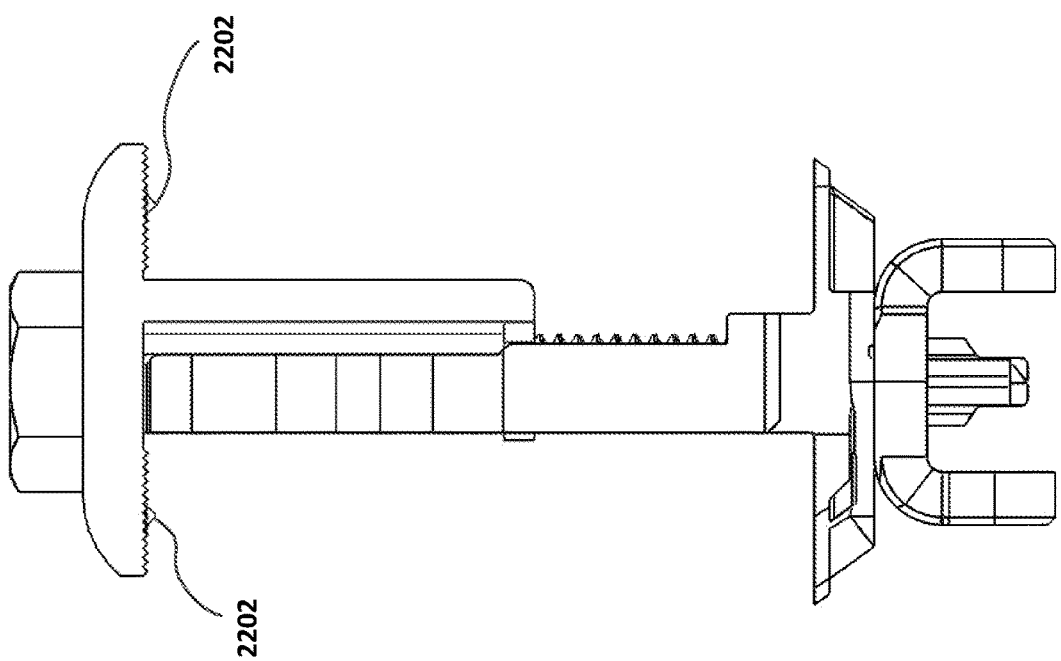
FIG. 25 illustrates a side view in a third alternative embodiment of a Clamp.

FIGS. 23-26 show examples of a third alternative embodiment of the present invention. FIG. 23 illustrates a left isometric view of the twist-lock clamp 100, and FIG. 24 illustrates a right isometric view of the twist-lock clamp 100. Many of the features illustrated and described above, are the same in this third alternative embodiment. In one difference between the earlier described embodiments, and the third alternative embodiment, the Bonding Clip 1102 is replaced by one or more Bond Pins 2202 on the lower surface of Top Clamp 101. In this third alternative embodiment, Bond Pins 2202 are inserted into the lower surface of Top Clamp 101, such as by drilling, screwing or pressing. The Bond Pins 2202 are typically stainless steel or another material that is harder than the solar module frame that is contacted by the Bond Pins when the Clamp is installed.

Figure 28:
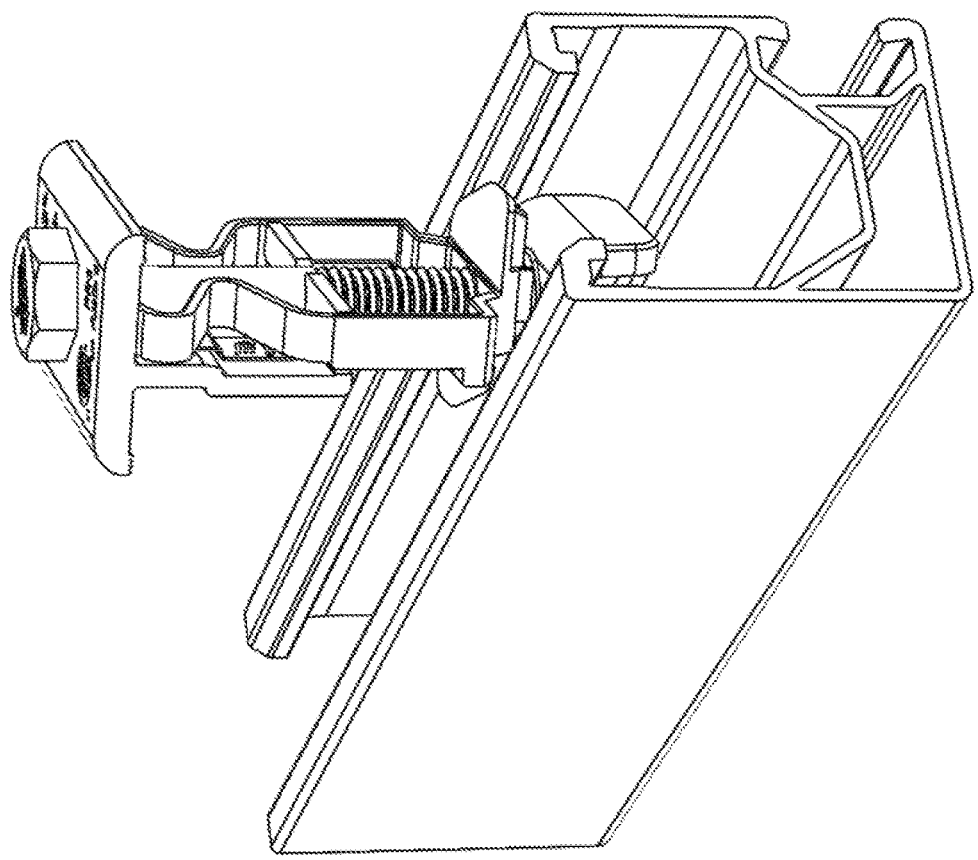
FIGS. 27-30 illustrate isometric views of installing the second alternative embodiment in a rail.
Figure 27:
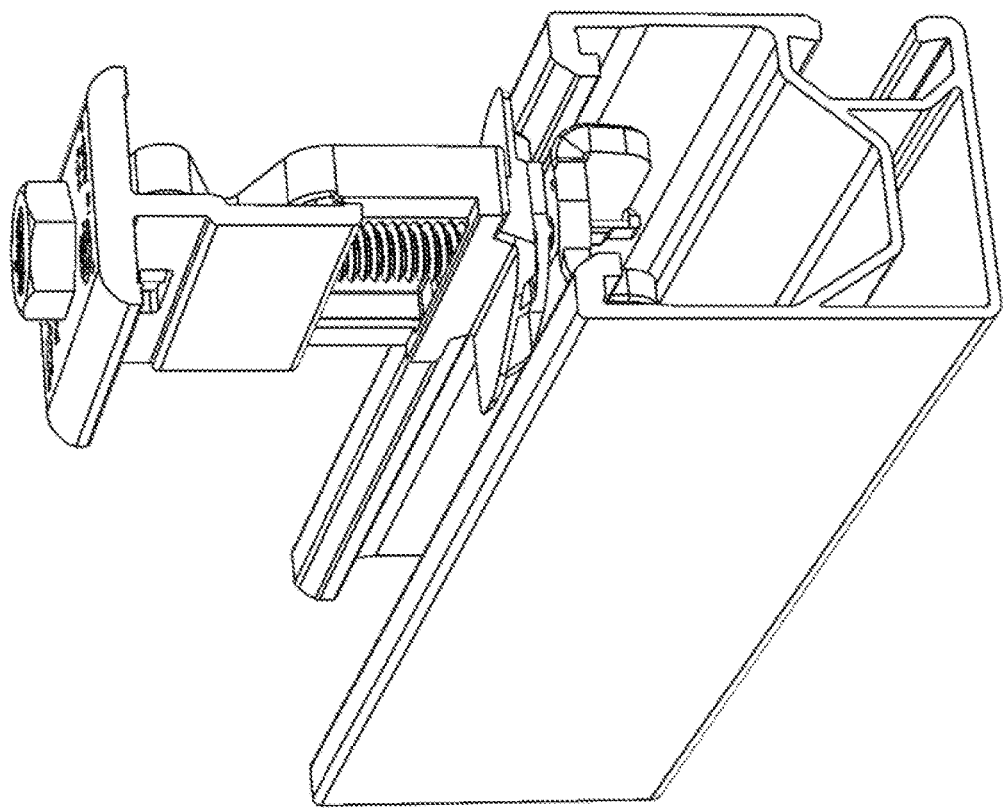
Figure 30:
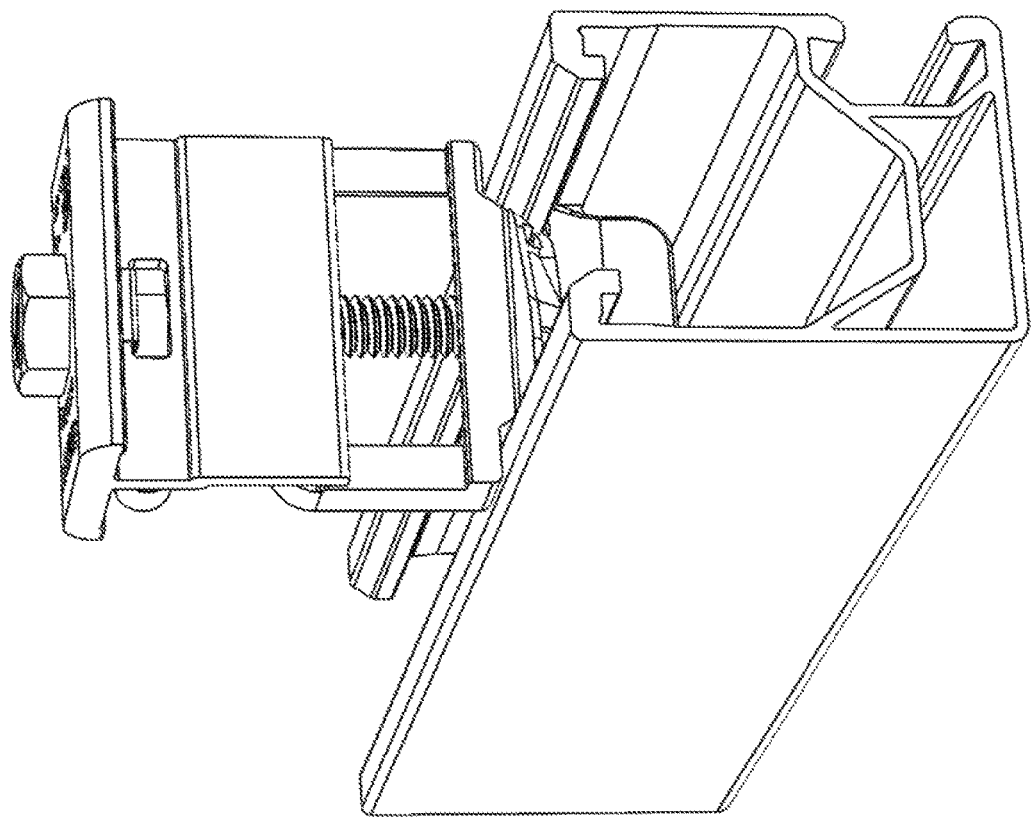
Figure 29:
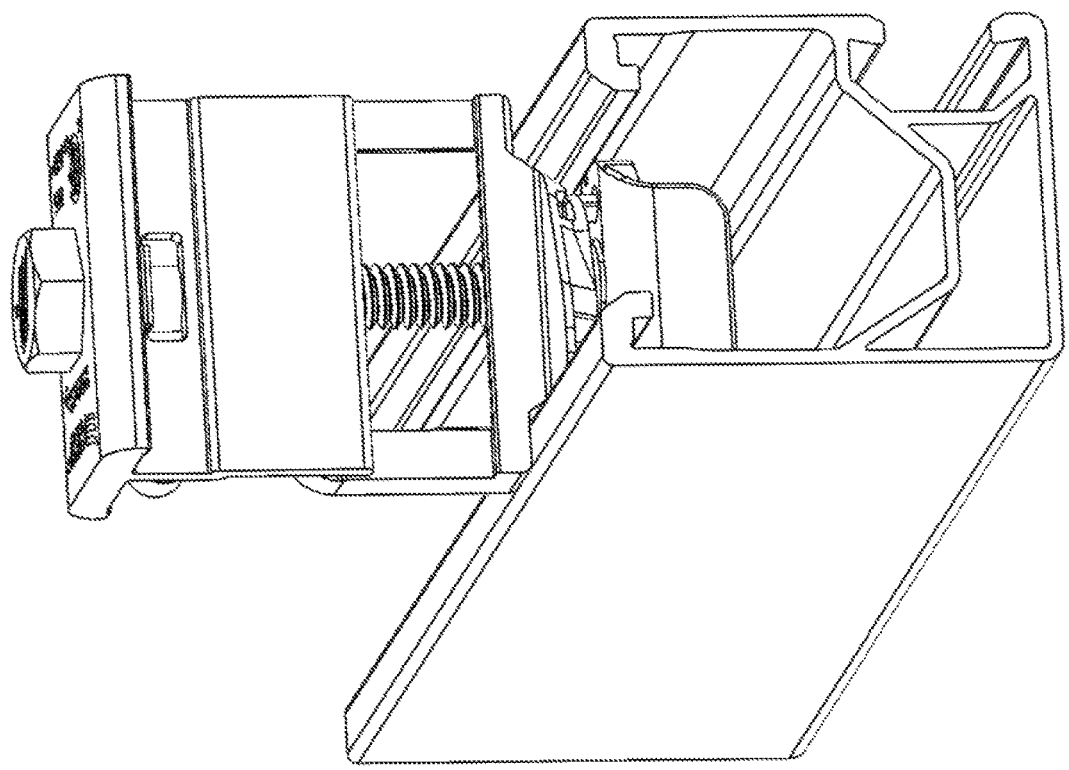

FIGS. 27-30 illustrate isometric views of the second alternative embodiment as the twist-lock clamp 100 is installed in a rail. In FIG. 27, the twist-lock clamp 100 is partially inserted in the Rail Channel 201. In FIG. 28, the T-nut is pressed down below Rail Prongs 202, and the twist-lock clamp 100 is partially rotated. In FIG. 29, the twist-lock clamp 100 is rotated into final position, and the T-nut is still pressed down below the Rail Prongs 202. In FIG. 30, the twist-lock clamp 100 is rotated into final position, and the T-nut is raised and engaged with Rail Prongs 202.

Figure 32:
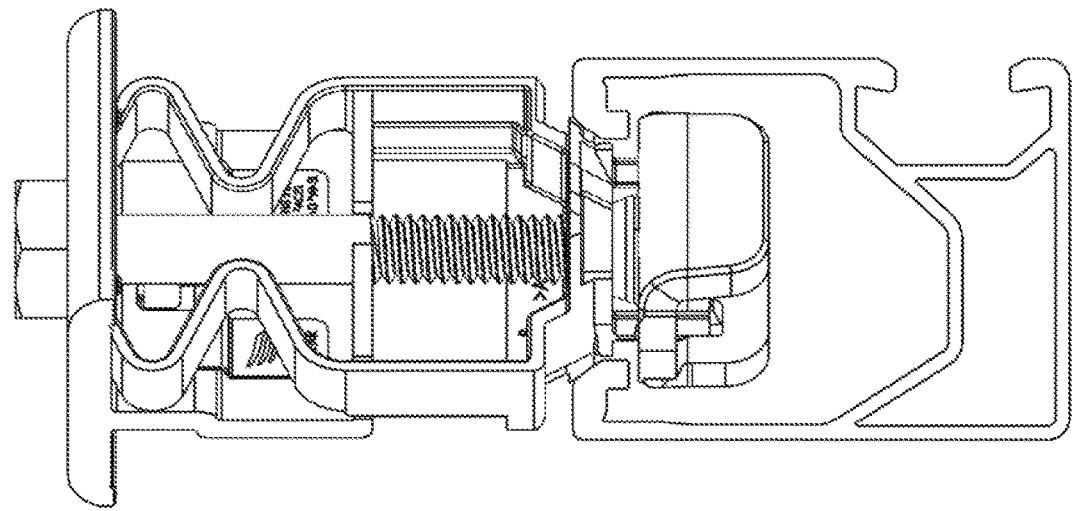
FIGS. 31-34 illustrate end views of installing the second alternative embodiment in a rail.
Figure 31:
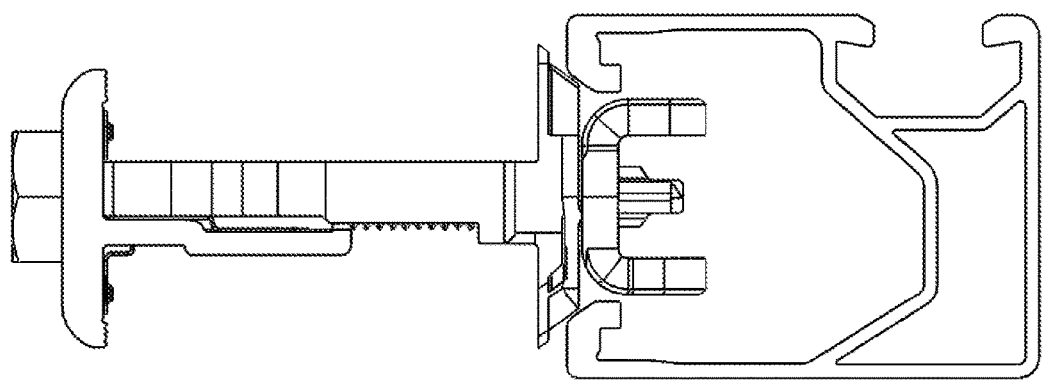
Figure 34:
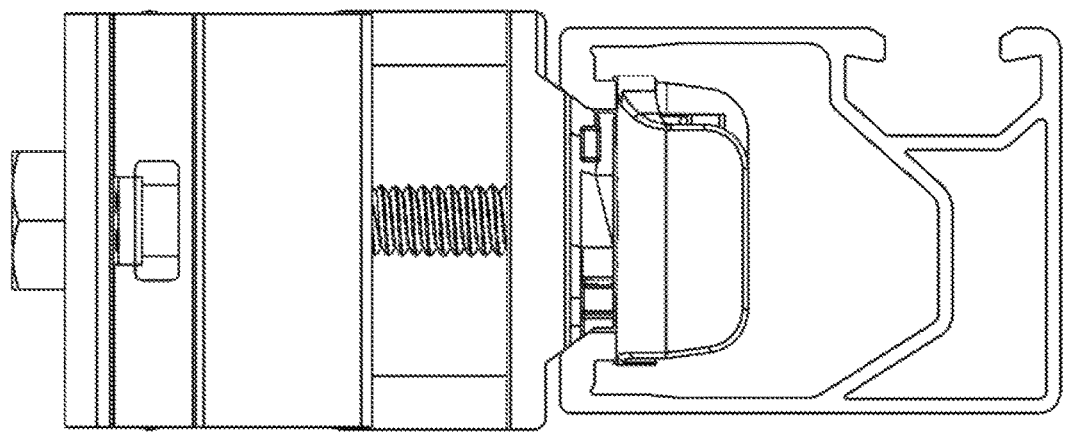
Figure 33:
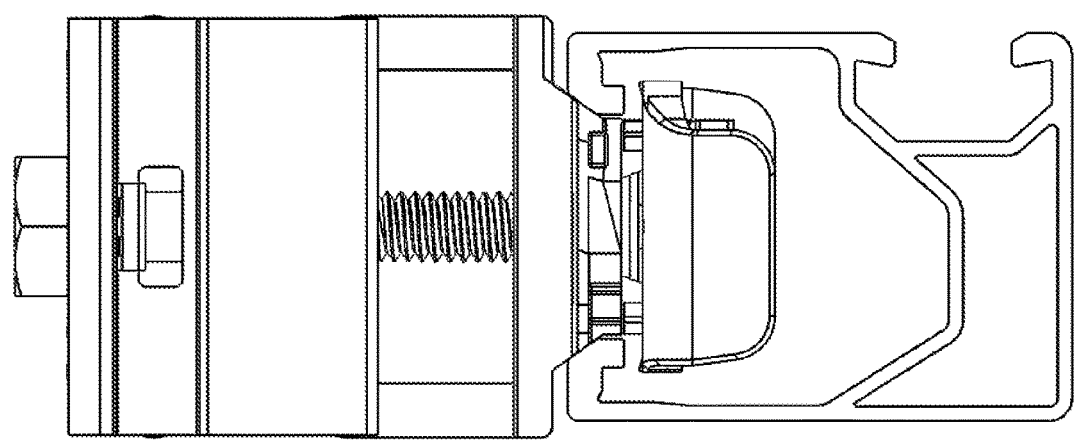

FIGS. 31-34 illustrate end views of the second alternative embodiment as the twist-lock clamp 100 is installed in a rail. In FIG. 31, the twist-lock clamp 100 is partially inserted in the Rail Channel 201. In FIG. 32, the T-nut is pressed down below Rail Prongs 202, and the twist-lock clamp 100 is partially rotated. In FIG. 33, the twist-lock clamp 100 is rotated into final position, and the T-nut is still pressed down below the Rail Prongs 202. In FIG. 34, the twist-lock clamp 100 is rotated into final position, and the T-nut is raised and engaged with Rail Prongs 202.

Although illustrative embodiments have been described herein in detail, it should be noted and will be appreciated by those skilled in the art that numerous variations may be made within the scope of this invention without departing from the principle of this invention and without sacrificing its chief advantages. For example features that appear in one embodiment of a particular figure are also applicable to embodiments that are illustrated in other figures.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A twist-lock clamp for attaching a solar module to a rail, comprising:
   a threaded fastener that includes raised rings for electrical contact;
   a top clamp having:
      a first planar member;
      a first aperture in the first planar member, the first aperture to accept the threaded fastener in an assembled configuration; and
      a second planar member orthogonal to the first planar member and connected to the first planar member inset from a distal end of the first planar member;
   a spring having:
      a second aperture to accept the threaded fastener in the assembled configuration; and
      a first planar surface including an angled protrusion that is configured to engage with a second planar surface of the rail in a locked configuration; and
   a threaded t-nut to engage with the threaded fastener placing the spring in compression between the top clamp and the threaded t-nut in the assembled configuration.

2. The twist-lock clamp of claim 1, wherein the raised rings are in electrical contact with the top clamp.

3. The twist-lock clamp of claim 1, wherein the spring further comprises at least two nut snaps, the at least two nut snaps cooperating with at least two offset apertures in the threaded t-nut to retain the threaded t-nut when the threaded fastener and threaded t-nut are disconnected.

4. The twist-lock clamp of claim 1, wherein the spring further comprises a flange adjacent to at least one nut snap, the flange having a first dimension narrower than a top opening of a slot width of the rail and a second dimension wider than the top opening of the slot width of the rail.

5. The twist-lock clamp of claim 1, further comprising at least one stainless steel bond pin on the first planar member of the top clamp.

6. The twist-lock clamp of claim 1, further comprising a bonding clip, the bonding clip having:
   a cutout to allow the threaded fastener to pass-through in the assembled configuration; and
   a plurality of raised contact points for electrical contact with the top clamp and the solar module.

7. The twist-lock clamp of claim 6, wherein lettering on the bonding clip identifies a side that faces an end panel.

8. The twist-lock clamp of claim 6, wherein the bonding clip further includes a flange that passes through an aperture in the top clamp, in the assembled configuration.

9. The twist-lock clamp of claim 1, wherein the spring includes at least one rib, and the top clamp incudes at least one rib aperture, the rib and rib aperture cooperating to constrain separate rotation of the spring and top clamp about an axis of the threaded fastener.

10. The twist-lock clamp of claim 1, wherein the top clamp has a lateral jog partway down the second planar member, the lateral jog a distance greater than a thickness of a bonding clip.

11. The twist-lock clamp of claim 1, wherein the top clamp has a third planar member at a distal end of the second planar member, the third planar member extending across the threaded fastener to coincide with a solar module frame in the assembled configuration.

12. A threaded t-nut comprising:
   a first planar member, the first planar member being generally rectangular and having a first dimension and a second dimension orthogonal to the first dimension, where the first dimension is less than the second dimension, the first planar member having:
      a central threaded aperture;
      at least one offset raised contact point for electrical contact with a rail; and
      at least one offset aperture laterally placed from the central aperture;
   a second planar member, substantially orthogonal to the first planar member; and
   a third planar member, substantially orthogonal to the first planar member, extending from the first planar member in a same direction as the second planar member, the third planar member substantially parallel to the second planar member.

13. The threaded t-nut of claim 12, wherein the central threaded aperture is cone-shaped and extends in a direction opposite the second and third planar members.

14. The threaded t-nut of claim 12, wherein the central threaded aperture is cone-shaped and extends in a same direction as the second and third planar members.

15. The threaded t-nut of claim 12, wherein the second planar member is generally rectangular, having a third dimension in a same direction as the second dimension of the first planar member, and the third dimension is less than the second dimension.

16. The threaded t-nut of claim 12, wherein the first dimension of the first planar member is less than a slot width of the rail with which the t-nut is used.

17. The threaded t-nut of claim 12, wherein the second dimension of the first planar member is greater than a slot width of the rail with which the t-nut is used.

18. The threaded t-nut of claim 12, wherein the threaded t-nut is made of a material having a hardness greater than the rail with which the t-nut is used.

\* \* \* \* \*